United States Patent
Schumacher et al.

(10) Patent No.: US 9,832,932 B2
(45) Date of Patent: Dec. 5, 2017

(54) TWINE KNOTTER

(71) Applicant: Rasspe Systemtechnik GmbH, Wermelskirchen (DE)

(72) Inventors: Friedrich-Wilhelm Schumacher, Birnbach (DE); Heinrich Gunter Schumacher, Eichelhardt (DE); Michael Flanhardt, Langenfeld (DE); Andreas Acimas, Solingen (DE)

(73) Assignee: Rasspe Systemtechnik GmbH, Wermelskirchen (DE)

( * ) Notice: Subject to any disclaimer, the term of this patent is extended or adjusted under 35 U.S.C. 154(b) by 419 days.

(21) Appl. No.: 14/569,661

(22) Filed: Dec. 13, 2014

(65) Prior Publication Data

US 2015/0097370 A1    Apr. 9, 2015

Related U.S. Application Data

(63) Continuation of application No. PCT/EP2012/061386, filed on Jun. 14, 2012.

(51) Int. Cl.
*A01F 15/14*    (2006.01)
*A01F 15/08*    (2006.01)

(52) U.S. Cl.
CPC ........ *A01F 15/145* (2013.01); *A01F 15/0858* (2013.01)

(58) Field of Classification Search
CPC .......................... A01F 15/0858; A01F 15/145
USPC .............................................. 289/1.2, 1.5, 2
See application file for complete search history.

(56) References Cited

U.S. PATENT DOCUMENTS

| | | | | |
|---|---|---|---|---|
| 2,403,396 A | * | 7/1946 | Raney | A01F 15/14 100/19 A |
| 2,413,378 A | * | 12/1946 | Raney | A01F 15/145 100/21 |
| 2,815,234 A | * | 12/1957 | Collins | A01F 15/145 289/10 |
| 3,243,214 A | * | 3/1966 | Keates | A01F 15/14 289/18.1 |
| 3,254,911 A | * | 6/1966 | Crawford | A01D 59/04 100/22 |

(Continued)

FOREIGN PATENT DOCUMENTS

DE    27 59 976    7/1982
DE    9015883    5/1991

(Continued)

*Primary Examiner* — Shaun R Hurley
*Assistant Examiner* — Bao-Thieu L Nguyen
(74) *Attorney, Agent, or Firm* — Harness, Dickey & Pierce, P.L.C.

(57) ABSTRACT

A twine knotter has a knotter frame (2). An intermediate shaft (3) is rotatably supported on the knotter frame (2) around a longitudinal axis L. A shaft input (4) connects the intermediate shaft (3) to an output element (61) of a knotter drive shaft (54). At least one knotter hook shaft (9, 10) is rotatably supported around a knotter hook axis (K1, K2) on the knotter frame (2). The at least one knotter hook shaft (9, 10) is drive-wise connected to the intermediate shaft (3). The at least one knotter hook shaft carries a knotter hook (11, 12) to form a knot. The twine knotter (1) is formed as an independent assembly. The twine knotter (1) is drive-wise detachably connectable, via the shaft input (4) of the intermediate shaft (3), to the knotter drive shaft (54).

19 Claims, 25 Drawing Sheets

(56) References Cited

U.S. PATENT DOCUMENTS

| | | | | |
|---|---|---|---|---|
| 3,400,959 A * | 9/1968 | Grillot | A01F 15/145 | 289/11 |
| 3,416,825 A * | 12/1968 | Nolt | A01F 15/145 | 289/13 |
| 3,418,015 A * | 12/1968 | Nolt | A01F 15/145 | 289/13 |
| 3,419,300 A * | 12/1968 | Nolt | A01F 15/14 | 289/13 |
| 3,419,301 A * | 12/1968 | Eby | A01F 15/145 | 289/13 |
| 3,468,575 A * | 9/1969 | Grillot | A01D 59/04 | 289/11 |
| 3,482,866 A * | 12/1969 | Eby | A01D 59/04 | 289/15 |
| 3,492,035 A * | 1/1970 | Bornzin | A01D 59/04 | 289/14 |
| 3,510,160 A * | 5/1970 | Bornzin | A01F 15/145 | 289/14 |
| 3,536,347 A * | 10/1970 | Radford | A01F 15/0858 | 289/2 |
| 3,712,654 A * | 1/1973 | Nolt | A01F 15/145 | 289/2 |
| 3,722,934 A * | 3/1973 | Nolt | A01F 15/14 | 289/13 |
| 4,022,121 A * | 5/1977 | Crawford | A01F 15/14 | 100/29 |
| 4,022,501 A * | 5/1977 | White | A01D 59/04 | 289/11 |
| 4,074,623 A * | 2/1978 | White | A01F 15/145 | 100/19 R |
| 4,108,062 A | 8/1978 | White | | |
| 4,142,746 A * | 3/1979 | White | A01F 15/145 | 100/19 R |
| 4,157,063 A * | 6/1979 | Minke | A01F 15/145 | 100/11 |
| 5,829,346 A * | 11/1998 | Ast | A01F 15/145 | 100/19 R |
| 6,070,403 A * | 6/2000 | Hawlas | A01F 15/0858 | 56/341 |
| 6,164,197 A * | 12/2000 | Prellwitz | A01F 15/145 | 100/20 |
| 6,644,181 B2 * | 11/2003 | Honhold | A01F 15/0858 | 100/19 R |
| 6,957,835 B2 * | 10/2005 | Rotole | A01F 15/145 | 100/29 |
| 7,296,828 B2 * | 11/2007 | Schoonheere | A01F 15/145 | 289/2 |
| 7,600,470 B2 * | 10/2009 | Eylenbosch | A01F 15/145 | 100/19 R |
| 7,752,959 B1 * | 7/2010 | Roth | A01D 69/12 | 100/22 |
| 8,590,945 B2 * | 11/2013 | Schumacher | A01F 15/145 | 289/2 |
| 8,671,834 B1 * | 3/2014 | Rotole | A01F 15/148 | 100/19 R |
| 9,107,347 B2 * | 8/2015 | Esau | A01F 15/0858 | |
| 2014/0103647 A1 * | 4/2014 | Schoonheere | A01F 15/145 | 289/1.5 |
| 2015/0305246 A1 * | 10/2015 | Demulder | A01F 15/145 | 100/33 R |

FOREIGN PATENT DOCUMENTS

| | | |
|---|---|---|
| DE | 102007000678 | 3/2009 |
| DE | 102008041120 | 2/2010 |
| DE | 102010038590 | 2/2012 |
| EP | 1532859 | 5/2005 |
| WO | WO2011-054360 | 5/2011 |

* cited by examiner

TWINE KNOTTER

CROSS-REFERENCE TO RELATED APPLICATIONS

This application is a continuation of International Application No. PCT/EP2012/061386, filed Jun. 14, 2012. The entire disclosure of the above application is incorporated herein by reference.

FIELD

The disclosure relates to a twine knotter. The twine knotter includes a knotter frame, an intermediate shaft, and at least one knotter hook shaft. The intermediate shaft is rotatably supported on the knotter frame around an axis of rotation. A shaft input connects the intermediate shaft to an output element of a knotter drive shaft. The at least one knotter hook shaft is rotatably supported around a knotter hook axis on the knotter frame. Drive-wise, the knotter hook shaft is connected to the intermediate shaft. The knotter hook shaft carries a knotter hook to form a twine knot.

BACKGROUND

Twine knotters are mainly used in large mobile rectangular bale presses for straw, hay, silage and similar materials as well as in recycling applications, e.g. for bundling paper, textiles, thin metal sheets and the same. Binding or bundling devices, equipped with such twine knotters, can also be part of packaging plants for cording packets, bales or bundles of materials.

In stationary or large mobile bale presses, the pressing material is filled into a pressing channel, which is at least rectangular in cross-section, preferably pre-compressed and is pressed to a rectangular string of material. The material is partitioned into box-shaped bales, conventionally known as square bales. The upper and lower side as well as outer sides is encompassed in a longitudinal direction of the pressing channel with several twine threads. The threads are knotted before expelling the bale. The feeding of necessary twine, the knotting process within the twine knotter as well as the interaction of pressing elements involved in forming a double knot are described for common double knotters in DE 27 59 976 C1.

Depending on the width of the bale and its pressing density, two or more double knot twine knotters are mounted next to each other on the knotter drive shaft of a press. The selection of the twine knotter and the pressing elements, supporting the knotting process, are determined by the number of necessary strappings of a bale.

The knotter drive shaft is arranged above or below the pressing channel. Ordinarily, it is arranged at least approximately horizontal and in general parallel to the pressing channel. At other pressing channels, the drive shaft is arranged laterally.

The economic efficiency of the cereal stem harvest depends on the collecting, freight, and storage costs. Straw, especially shredded material, is used as bedding in poultry housing, dairy cattle cubicles and other stables. Straw further serves as feed in crude fibre weak feed rations as ground cover in strawberry cultivation and as a breeding ground for mushroom cultivation. To enable such applications, big bale presses are equipped with cutting devices or shredding devices at their front end. Generally in the feeding channel arranged in front of the main pressing channel, a pre-compressing of the pressing material is carried out. It is only transferred into the main pressing channel when a predetermined amount, with defined pressing material density, is available. Accordingly, high density bales with high weight are produced.

As the mobile presses are not only transferred from one to the other field but also are used extra farm wide, they have to be fit for over the road driving. Thus, they have to meet Road Traffic Licensing Regulations. This means that the machine dimensions are not increasable without limits. Also the dimensions of the individual bales have to have, for an optimal lorry loading and later storage, suitable measurements.

To increase the bale weight still further, wherein better transportation capacities can be utilized and the holding together of a bale is increased, an increase of the compression of the bale, with comparable moisture content of the pressing material, has to be accomplished. With such a goal in mind, consideration needs to be given to the currently available plastic pressing twines, mainly polypropylene twines, which have a limited tear strength. These twines will tear with increased pressing material density when the bale is expelled from the pressing channel. The thickness of the pressing twine, which is determined by the running length of the twine thread, is expressed in terms of how many meters of twine weigh one kilogram (units: m/kg). The twine thickness cannot be readily continuously increased. The individual knotter components are adjusted to the quality of the pressing twines. Thicker twines, with increased tear strength, would disadvantageously increase the dimensions of the twine knotter, wherein it is dubious whether a secure functioning of the twine knotter, especially according to the so-called Deering working principle, can be achieved.

In order to increase the weight of a bale at constant moisture content of the to be packaged material, without at the same time increasing the dimensions, WO 2011/054360 A1 proposes to increase the number of the to be knotted twine threads. Up to now, six twine knotters for knotting six parallel twine threads is common. The solution according to WO 2011/054360 A1 proposes eight twine threads. In this case, double knot twine knotters are provided, respectively, with one knotter drive disc non-rotationally mounted on the knotter drive shaft, driven around its axis and with a knotter chassis belonging to the knotter drive disc. The knotter chassis is spatially held stationary at one end relative to the pressing channel and at the other end relative to the knotter drive shaft. The knotter chassis carries one knotter assembly forming two knots one after the other. A knife lever is driven by a cam track of the knotter drive disc. The knotter assemblies comprise at least one twine holder, driven by a first drive tooth of the knotter drive disc. A knotter hook is driven by a second drive tooth of the knotter drive disc. The knife lever has a three-fold function. First, it serves as a twine guide. Second, it cuts the twine. Third, it pushes the twine loops off the knotter hook. The knotter assembly is arranged totally axially off-set relative to the hub of the knotter drive disc and of the drive-shaft sided end of the knotter chassis. The respective knotter assembly and, if necessary, also the pivot area of the knife lever overlap in an axis direction of the knotter drive shaft. The knotter drive disc of the neighboring double knot-twine knotter, over a partial length of the knotter assembly and, if necessary, also of the pivot lever of the knife area. In this manner, a certain de-coupling is achieved concerning the dimensional requirements of the hub of the knotter drive disc and those of the drive-shaft-sided attachment of the knotter chassis from the arrangement and construction of the knotter assembly and of the knife lever. Considerable length portions of the right and/or left neighboring double knot-twine knotter overlap with the double knot-twine knotter arranged therebetween. In this manner, the effective length of a double knot-twine knotter, in relation to the knotter drive shaft, can be shortened, as it is allowed by the drive assembly or the knotter assembly or the knife lever. The effective length of the double knot-twine knotter is determined by the assembly of the three assemblies, which, concerning the knotter drive shaft, has the largest length.

All above named twine knotters have the knotter drive discs, which are part of the twine knotter, arranged in sequence, one after the other, on the knotter drive shaft. If, due to a defect, one of the twine knotters has to be dismantled or exchanged, all knotter drive discs and, thus, all the twine knotters, which are arranged between the to be exchanged knotter drive disc and the end of the knotter drive shaft, also have to be dismantled.

SUMMARY

The present disclosure has an object to provide an arrangement where the assembly and dismantling of the individual twine knotters on a pressing device is less cumbersome.

The object is met by a twine knotter according to the disclosure.

Accordingly, the twine knotter is formed as an independent unit or assembly. The twine knotter is drive-wise detachably connectable, via the shaft input of the intermediate shaft, to the knotter drive shaft. Thus, each individual twine knotter can individually be dismantled from the knotter drive shaft without also having to dismantle further twine knotters.

The knotter hook axis of the at least one knotter hook shaft and the longitudinal axis of the intermediate shaft are, in this case, arranged such that they intersect each other or cross each other at a distance. As the knotter drive shaft is generally transversally arranged above the pressing channel, of a big bale press, the intermediate shaft can be arranged in a direction of the pressing channel. Thus, the smallest possible design space is necessary for the twine knotter in a direction transverse to the pressing channel or along the knotter drive shaft. Thus, a twine thread distance can be realized, that is smaller than those in common double knotters. Thus, a multitude of twine knotters, e.g. eight twine knotters, can be arranged next to each other.

The twine knotter can be formed as a double knotter. It knots two knots at the same time. For this, the twine knotter has two knotter hook shafts. The knotter hook shafts are rotatably supported respectively around a knotter hook axis on the knotter frame and which, respectively, are drive-wise connected to the intermediate shaft. In this case, the knotter hook axes of the two knotter hook shafts can be arranged parallel to each other.

A drive connection between a respective one knotter hook shaft and the intermediate shaft can be produced via, respectively, one gear connection. In this case a bevel-gear connection. Each gear connection has a first gear. The first gear rests non-rotationally on the intermediate shaft and has circumferential extending uninterrupted teeth. A second gear of the at least one knotter hook shaft meshes with the first gear.

The twine knotter can have a reserve holder for temporarily forming a twine reserve. The reserve holder is driven, by the intermediate shaft and is movably held on the knotter frame.

The twine knotter has, for each knotter hook shaft, a twine catch for pressing the twine threads onto the knotter hook of the respective knotter hook shaft. The twine catch or twine catches are driven by the intermediate shaft. They are movably held on the knotter frame. Commonly, the twine catches are provided on a frame of the big bale press separate from the twine knotter. In this case, the synchronization with the twine knotter is difficult, which is facilitated by an integrated arrangement of the twine knotter on the knotter frame. The twine catch is also driven by the intermediate shaft of the twine knotter, which leads to a further simplification of the synchronization.

The twine knotter can have a redirection device for redirecting the twine threads. The redirection device is also adjustably held on the knotter frame and is driven by the intermediate shaft. This is especially advantageous, when the twine knotter is formed without a pulling-off lever for pulling the knots off the knotter hooks. In this case, the knots are pulled-off by the pressing pressure of the bales in the pressing channel from the knotter hooks. However, a redirection of the twine threads has to be carried out. Thus, the redirection device serves this purpose.

A control cam drives and controls at least one device selected from the group of reserve holder, twine catch and redirection device. The control cam can be provided on the intermediate shaft. In this case, the respective device may have a lever that is pivotable around a pivot axis arranged parallel to the longitudinal axis on the knotter frame. A control element, in the form of a roller on the lever, rests against the respective control cam of the intermediate shaft and is loaded by a force. A coupling rod can articulatedly be arranged between the lever and the respective device.

An object is further met by a drive arrangement with a knotter drive shaft and several above described twine knotters. An angle gear with an output element is provided for each twine knotter on the knotter drive shaft. The output element is connected to the shaft input of the respective twine knotter.

The above described twine knotter is preferably operated according to the following method:

An upper twine thread and a lower twine thread are positioned in an operating area of a first knotter hook and of a second knotter hook of the twine knotter. The knotter hooks are, respectively, in a starting portion.

The knotter hooks are rotated from the starting position into an abutment position. Here, the upper twine thread and the lower twine thread come to rest on the knotter hooks.

The knotter hooks are subsequently rotated by one revolution to form, respectively, one loop from both twine threads. The twine threads are subsequently between the knotter hooks. Finally, the knotter hooks are rotated, a second time, further up to the starting position.

In this case, the knotter hooks are rotated for each knotting process by two complete revolutions.

Preferably, at least one of the twine threads is brought, by a twine needle along a twine feeding direction, into the operating area of the knotter hooks. In the starting position of the knotter hooks, the formed loops are pulled-off against the twine feeding direction from the first knotter hook and in the twine feeding direction from the second knotter hook by advancing the pressing material in a pressing channel.

When rotating the knotter hooks for forming loops, one twine catch is actuated for each knotter hook. The knotter hook holds the upper twine thread and the lower twine thread on a hook portion of the respective knotter hook. When actuating the twine catch, a redirection roller of a redirection device is actuated. The upper twine thread and the lower twine thread are guided from the second knotter hook in a twine feeding direction to the redirection roller and from there against the twine feeding direction up to the pressing channel.

When forming the knots with pulled-through knot ends or twine ends, a twine piece is produced. The twine piece is commonly between three and five centimeters long and is a so-called waste end. It is cut-off. Depending on the application place of operation of the press, these twine rests are undesirable. For example, animal furs can be discolored by coloring twine rests in connection with water or animal excretions.

To prevent this, loop knots are preferably formed in the present case. The knot ends are bound into the knot. The knot ends are not completely pulled through. In this case, these twine rests do not occur. Furthermore, the strength of the loop knots is higher than that of the knots with pulled-through knot ends. The knot strength determines the strength of the bale strapping. The selection of suitable pressing twines is essentially influenced by the use of double knot knotters.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Figure 1:
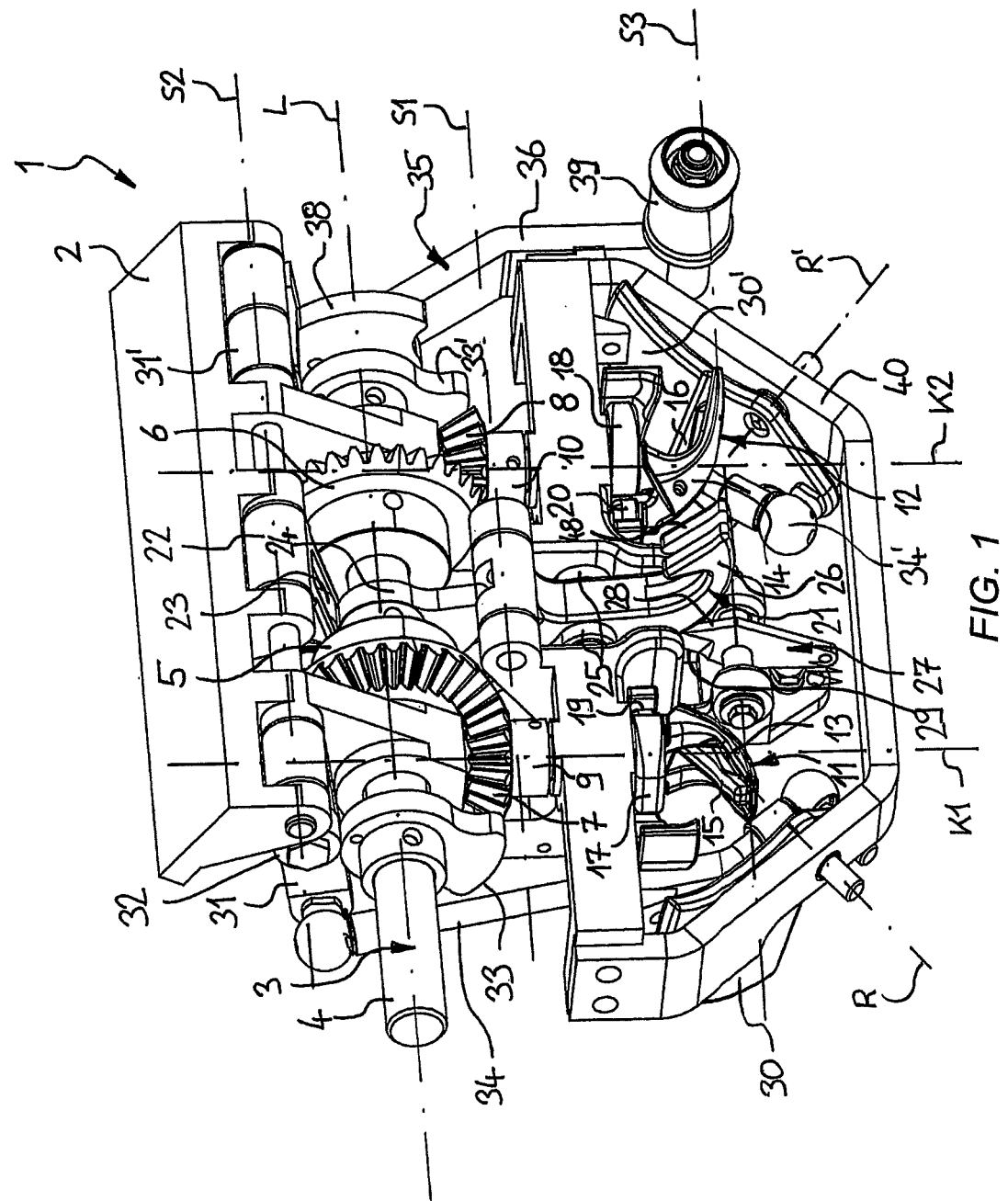
FIG. 1 is a perspective view of a twine knotter.

FIG. 1 shows a twine knotter 1 according to the disclosure with a knotter frame 2. All functional components of the twine knotter are mounted on the knotter frame. Thus, this forms an independent assembly group or unit. An intermediate shaft 3 is rotatably supported around a longitudinal axis L on the knotter frame 2. The intermediate shaft 3 has a shaft input 4. The intermediate shaft 3 can drive-wise be connected to an output element of a knotter drive shaft. In the present case, the shaft input 4 is formed as a journal. The journal is connectable, via an output element of an angle drive, to the knotter drive shaft.

A first input-bevel-gear 5 and a second input-bevel-gear 6 are non-rotationally attached on the intermediate shaft 3. The two input-bevel-gears 5, 6 are mirror-invertedly arranged and formed to a symmetry plane. The plane is arranged at a right angle to the longitudinal axis L. This means, that the teeth of the two input-bevel-gears 5, 6 face away from each other. In principle, they can also face each other. The teeth of the input-bevel-gears 5, 6 uninterruptedly extend around the circumference. The first input-bevel-gear 5 meshes with a first output-bevel-gear 7. The output bevel gear 7 non-rotationally sits on a first knotter hook shaft 9. The second input-bevel-gear 6 meshes with a second output-bevel-gear 8. The second output bevel gear 8 non-rotationally rests on a second knotter hook shaft 10.

The first knotter hook shaft 9 is rotatably supported around a first knotter hook axis K1 on the knotter frame 2. The second knotter hook shaft 10 is rotatably supported around a second knotter hook axis K2 on the knotter frame 2. The two knotter hook axes K1, K2 are aligned parallel to each other and intersect the longitudinal axis L at a right angle. Also, other arrangements might be taken into account where the knotter hook axes K1, K2 cross the longitudinal axis at a distance thereto. If necessary, knotter hook axes K1, K2 are not arranged at a right angle to the longitudinal axis L. The knotter hook axes K1, K2 do not compulsively have to be arranged parallel to each other.

The first knotter hook shaft 9, at its end, includes a first knotter hook 11 to form a knot in a twine thread. This first knotter hook 11 includes a first hook portion 13 that laterally projects from the first knotter hook shaft 9. A first knotter tongue 15 also projects laterally. The first knotter tongue 15 is movably arranged in a generally known manner to clamp a twine thread between the first hook portion 13 and the first knotter tongue 15.

The second knotter hook shaft 10 carries at its end, identically to the first knotter hook shaft 9, a second knotter hook 12. The second knotter hook has a laterally projecting second hook portion 14 and a second knotter tongue 16. The two knotter hooks 11, 12 can be formed identically or preferably mirror-images symmetrical to the symmetry plane. The symmetry plane is arranged at a right angle to the longitudinal axis L.

A first knotter hook control cam 17 is provided to drive the two knotter tongues 15, 16. the control cam 17 is stationarily arranged on the knotter frame 2. The control cam 17 has an outer circumferential face that extends around the first knotter hook axis K1. The first knotter tongue 15, with a first knotter tongue roller 19, is radially supported on and elastically loaded against the first knotter hook control cam 17. The first knotter hook control cam 17 has an extension around the first knotter hook axis K1 that deviates from a circular path. Thus, during rotation of the first knotter hook shaft 9, the first knotter tongue 15 is opened and closed relative to the first hook portion 13 by means of the lever effect in a known manner.

Analogously, a second knotter hook control cam 18 is provided to control the second knotter tongue 16. The second knotter tongue 16, with a second knotter tongue roller 20, is supported on and loaded against the control cam 18. The two knotter hook control cams 17, 18 are, in this case, also formed as symmetrically mirror images to the symmetry plane. The plane of symmetry is arranged at a right angle to the longitudinal axis L.

The symmetrical mirror-image arrangement of the two input bevel-gears 5, 6 enables the two knotter hook shafts 9, 10 to be driven in opposite directions to each other. Thus, since the two knotter hook control cams 17, 18 are also formed as symmetrically mirror images, the two knotter hooks 11, 12 open at the same time.

A reserve holder 21 is arranged between the two knotter hook shafts 9, 10. The reserve holder 21 is formed in the shape of a lever arm and is pivotably supported around a first pivot axis S1 on the knotter frame 2. The first pivot axis S1 is arranged parallel to the longitudinal axis L. A lever 22 is provided to the reserve holder 21. The lever 22 is pivotably supported around a second pivot axis S2 on the knotter frame 2. The second pivot axis S2 is arranged parallel to the longitudinal axis L. The lever 22 is supported, via a control element in form of a roller 23, on a control cam 24.

The control cam 24 extends around the longitudinal axis L and rotates with the intermediate shaft 3. The control cam 24 has a course deviating from a circular path. Thus, according to FIG. 1, the lever 22 can be lifted and lowered.

A coupling rod 25 is pivotally mounted on the lever 22. Also, the coupling rod 25 is pivotably mounted on the reserve holder 21 so that the movement of the lever 22 causes a movement of the reserve holder 21.

At a lower end, the reserve holder 21 has a hook portion 26. A twine thread is gripped by the hook portion 26 and can be pulled, to the rear, in the orientation of the twine knotter 1 shown in FIG. 1 to form a twine reserve to form twine knots. The hook portion 26 is centrally slotted in a plane. The plane is arranged at a right angle to the first pivot axis S1. During the pivoting of the reserve holder 21 backwards, the hook portion 26 slips over a foldable knife 27. The knife 27 is pivotably mounted around a third pivot axis S3 on the knotter frame 2. The third pivot axis S3 is arranged parallel to the longitudinal axis L.

When moving the reserve holder 21 backwards from the starting positions shown in FIG. 1, a twine thread, which is pulled backwards by the reserve holder 21, abuts a back 28 of the knife 27. The back 28 of the knife is facing away from the cutting edge 29 of the knife. In this case, the knife 27 is displaced from the starting position shown in FIG. 1 to a folded back position, till the twine thread has passed the knife 27. After this, the knife 27 is pivoted back in a spring loaded manner into the starting position shown in FIG. 1. During backwards movement of the reserve holder 21 into its starting position, the twine thread abuts the cutting edge 29 of the knife 27 and is cut.

Additionally, two twine catches 30, 30' are provided on the knotter frame. The twine catch 30 is exemplary described for the first knotter hook 11. The twine catch 30 is correspondingly designed to the second knotter hook 12. The twine catch 30 is pivotably mounted around a catch axis R on the knotter frame 2. The catch axis R is, in this case, arranged at an angle to the first knotter hook axis K1. In the present case, the angle deviates from a right angle. The twine catch 30 serves, as in the twine knotters according to the state of the art, to press a twine thread against the first knotter hook 11, to be able to form a knot. In this case, the twine catch 30 is pivoted during the forming of the knot against the twine thread.

A further lever 31 is provided to drive the twine catch 30. The lever 31 is pivotably supported around the second pivot axis S2 on the knotter frame 2. The lever 31 is supported via a control element, in form of a roller 32 on a control cam 33.

The control cam 33 is non-rotationally arranged on the intermediate shaft 3. The control cam 33 has a course that deviates from a circular path so that the lever 31 is moved during a rotation of the intermediate shaft 3. A coupling rod 34 is pivotably mounted on the lever 31. The coupling rod 34 is also pivotably mounted on the twine catch 30. Thus, the movement of the lever 31 is transferred onto the twine catch 30.

Furthermore, a deflecting device 35 is provided. It includes a pivot arm 36 that is pivotably mounted around the second pivot axis S2 on the knotter frame 2. The pivot arm 36 is supported via a control element, in form of a roller 37, on a control cam 38 of the intermediate shaft 3. The control cam 38 also has a course that deviates from a circular path.

Thus, when rotating the intermediate shaft 3, the pivot arm 36 is pivoted around the second pivot axis S2. A portion of the pivot arm 36, facing to the front, rotatably supports a redirection roller 39. With the help of the redirection roller, a twine thread, as described later, can be directed. The redirected roller 39 can be pivoted into or out of the area of a twine thread by means of the pivotable arrangement of the pivot arm 36.

The twine knotter 1 has a downward bracket 40. The bracket 40 is part of the knotter frame 2. The twine catches 30, 30' are pivotably mounted on the bracket 40. The bracket 40 serves also as an attachment element of the entire twine knotter 1 onto a press. The bracket 40 also has the function of a protection bracket for the knotter hooks 11, 12.

The twine knotter 1, formed with its knotter frame 2, is a separate assembly group or unit. All functional components of the twine knotter 1 are mounted or supported on the knotter frame 2. The twine catches 30, 30' on the knotter frame 2 represent a design that establishes the synchronization of the twine catches 30, 30' for the knotter operation steps in an especially simple manner. The entire twine knotter 1 can be mounted, via the knotter frame 2, on a press. The shaft input 4 of the intermediate shaft 3 can be connected to a knotter drive shaft of a press.

On the knotter drive shaft of the press itself and also on the press or its frame, no further functional components of the twine knotter exist. Thus, during a defect of the entire twine knotter 1, it can be dismantled as a unit or an assembly group, without influencing further present twine knotters on the same press or twine knotter, that are driven by the same knotter drive shaft. An additional dismantling of the other twine knotters is not necessary.

In the following, the general process of binding two knots is described by using FIGS. 2 to 8. For simplification, only the twine knotter is represented with twine threads. The further components are initially not shown for simplification.

Generally, the twine knotter 1, shown in FIGS. 2 to 8 and corresponding to the twine knotter of FIG. 1, is arranged on a press. A bale press for the agricultural sector is also shown in WO 2011/054360 A1. The twine knotter 1 is aligned such that the longitudinal axis L is aligned in a driving direction (F). A twine redirection roller 41 is arranged when seen in a driving direction in front of the twine knotter.

Figure 2:
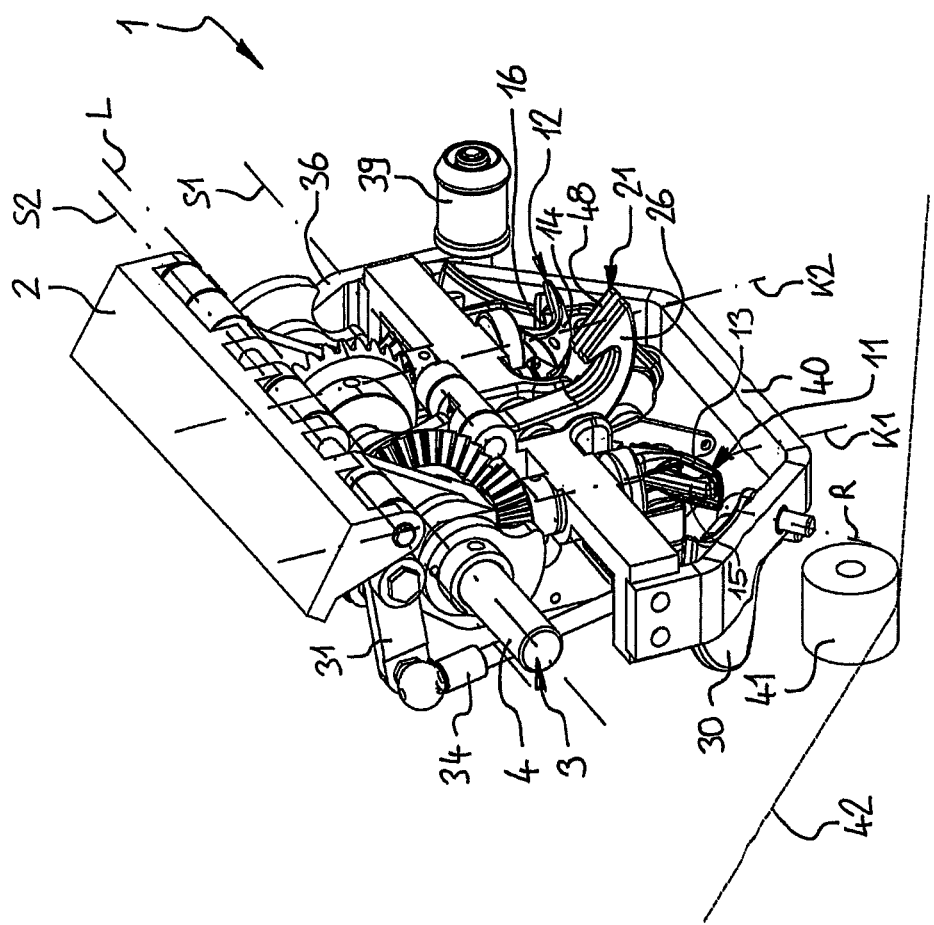
FIGS. 2-8 are perspective views of the twine knotter of FIG. 1 in different positions of the individual components illustrating a binding process.

Before binding knots, the knotter hooks 11, 12 are arranged in the starting position shown in FIG. 2. The knotter tongues 15, 16 are in a closed position. The knotter hooks 11, 12 face, concerning the already above mentioned symmetry plane, which is arranged at a right angle to the longitudinal axis L, laterally away from each other. The first knotter hook 11 faces in direction to the twine redirection roller 41. The second knotter hook 12 faces in a direction to the redirection roller 39. The redirection roller 39 is pivoted by the pivot arm 36 into a front position into the area of the twine thread guide. Also, the reserve holder 21 is pivoted into a front position. The hook portion 26 of the reserve holder 21 is also arranged in the guide area of the twine threads. In this connection, "pivoted forward" means that the components, i.e. the redirection roller 39 and the hook portion 26 of the reserve holder 21, are pivoted to the right side in the representation of FIG. 2.

An upper twine thread 42 is, as shown in the representation of FIG. 2, guided from a thread roller, not shown here, via known means. Also not shown are tensioning and decelerating devices coming from the top left around the twine redirection roller to the bottom right to an upper side of a bale.

Figure 3:
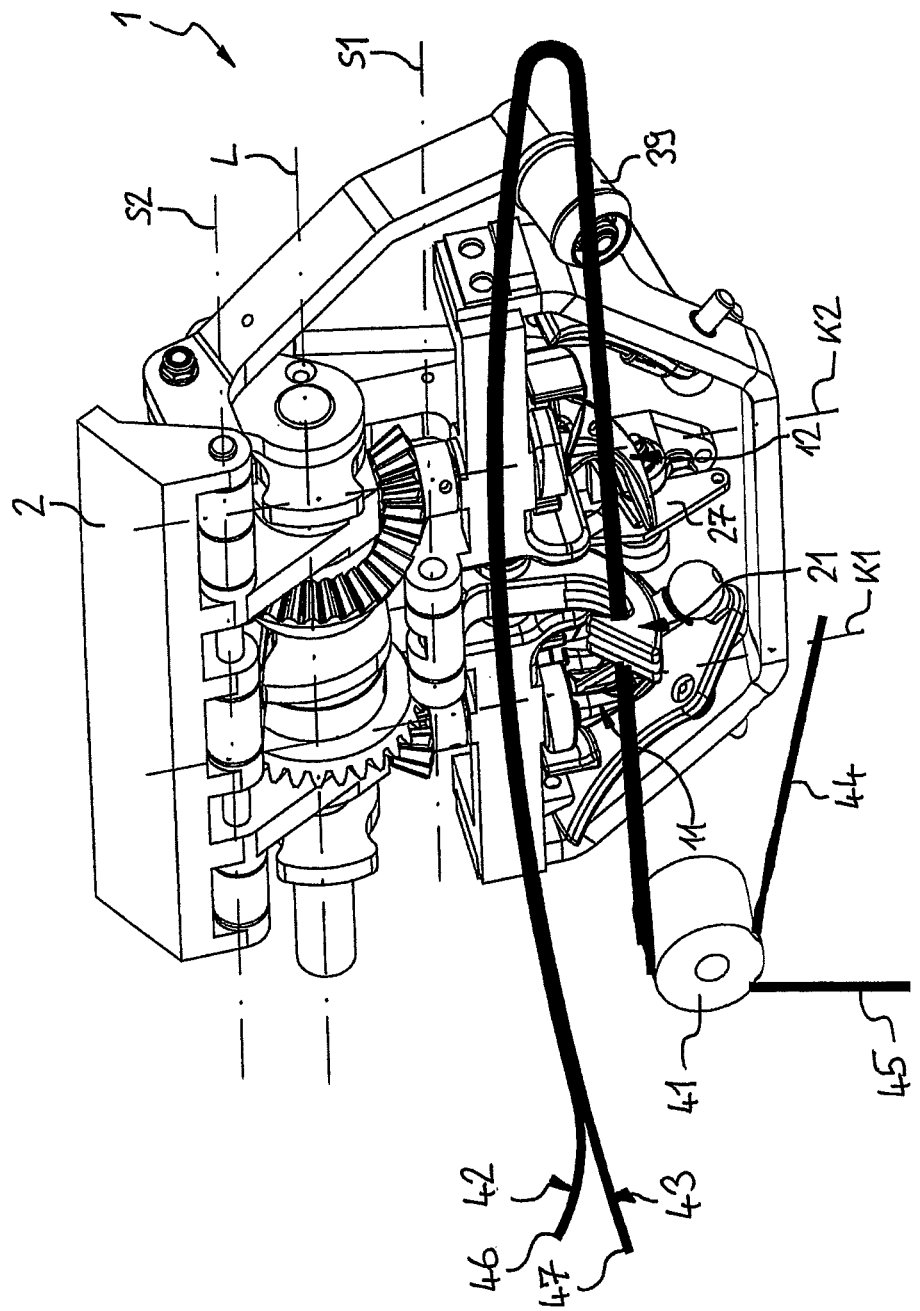

In a first method step, after activating the binding process, a binding needle, as shown later, is moved. The binding needle moves a lower twine thread 43 upwards. The lower twine thread 43 extends from a lower twine roller, via not shown known tensioning and decelerating devices, to a lower side of the bale. During the upward movement of the binding needle, it engages the upper twine thread 42 and transfers both twine threads 42, 43 together into the knotter area. The binding needle moves in this area against the driving direction and initially passes the twine redirection roller 41, the first knotter hook 11, the hook portion 26 of the reserve holder 21, the second knotter hook 12 and finally the redirection roller 39. After this, the two twine threads 42, 43 are arranged with their ends 44, 45 leading to the bale around the twine redirection roller 41 and are arranged on the knotter tongues 15, 16 of the knotter hooks 11, 12, as well as on the hook portion 26 of the reserve holder 21. The twine catches 30, 30' are still arranged in their starting position outside of the guide area of the twine threads 42, 43. The redirection roller 39 was pivoted backwards by means of the pivot arm 36 out of the guide area of the twine threads 42, 43. Thus, the twine threads 42, 43 do not rest on the redirection roller 39. The knotter hook shafts 9, 10 are rotated up to a position where the knotter hooks 11, 12 face each other and project into the guide area of the twine threads 42, 43. In the course of this, the first knotter hook 11 is, when seen from above, rotated clockwise and the second knotter hook 12 is, when seen from above, rotated counterclockwise (FIG. 3).

Figure 4:
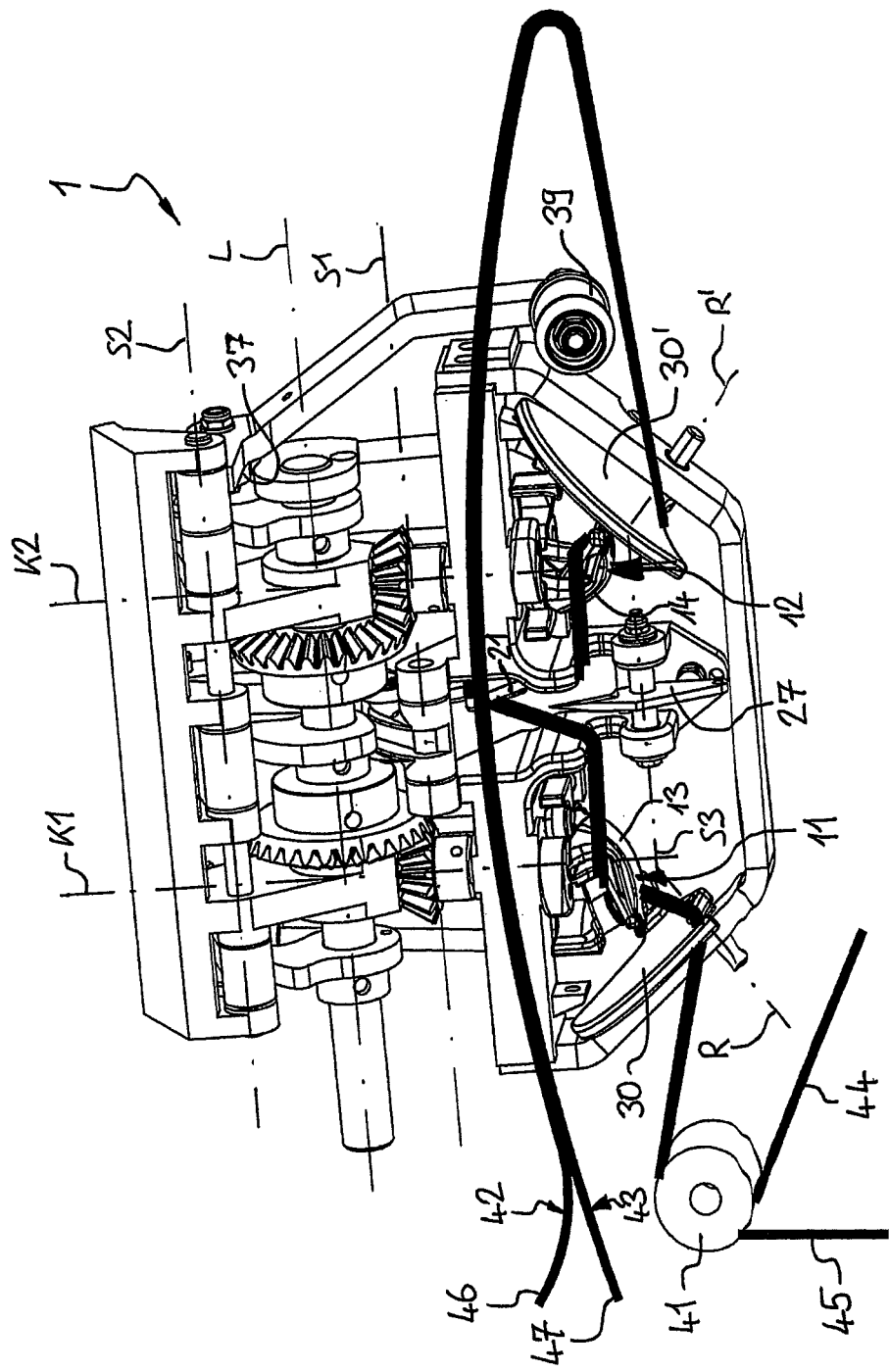

FIG. 4 shows the twine knotter 1, when the binding needle has nearly reached its uppermost position. The twine catches 30, 30' are pivoted into the guide area of the twine threads 42, 43 and push the twine threads downwards so that they are held on the knotter hooks 11, 12. In the course of this, the twine threads 42, 43 are pushed downwards outside of the pivot area of the hook portions 13, 14 of the knotter hooks 11, 12, to ensure a secure engagement of the twine threads 13, 14 by the knotter hooks 11, 12 during the further rotation of the same. Furthermore, the reserve holder 21 is pivoted backwards into a retracted position. The reserve holder 21 has pulled a twine reserve between the two knotter hooks 11, 12. The twine threads 42, 43, held on the reserve holder 21, are pulled, in this case, across the knife 27 deviating because of the spring force, as described above. In the gap formed between the twine catch 30' on the second knotter hook 12 and the binding needle tip, the redirection roller 39 is pivoted into a front position till the position according to FIG. 4 is reached. Furthermore, the knotter hooks 11, 12 are further rotated in the same rotational sense as described above and are arranged again more or less in the starting position.

Figure 5:
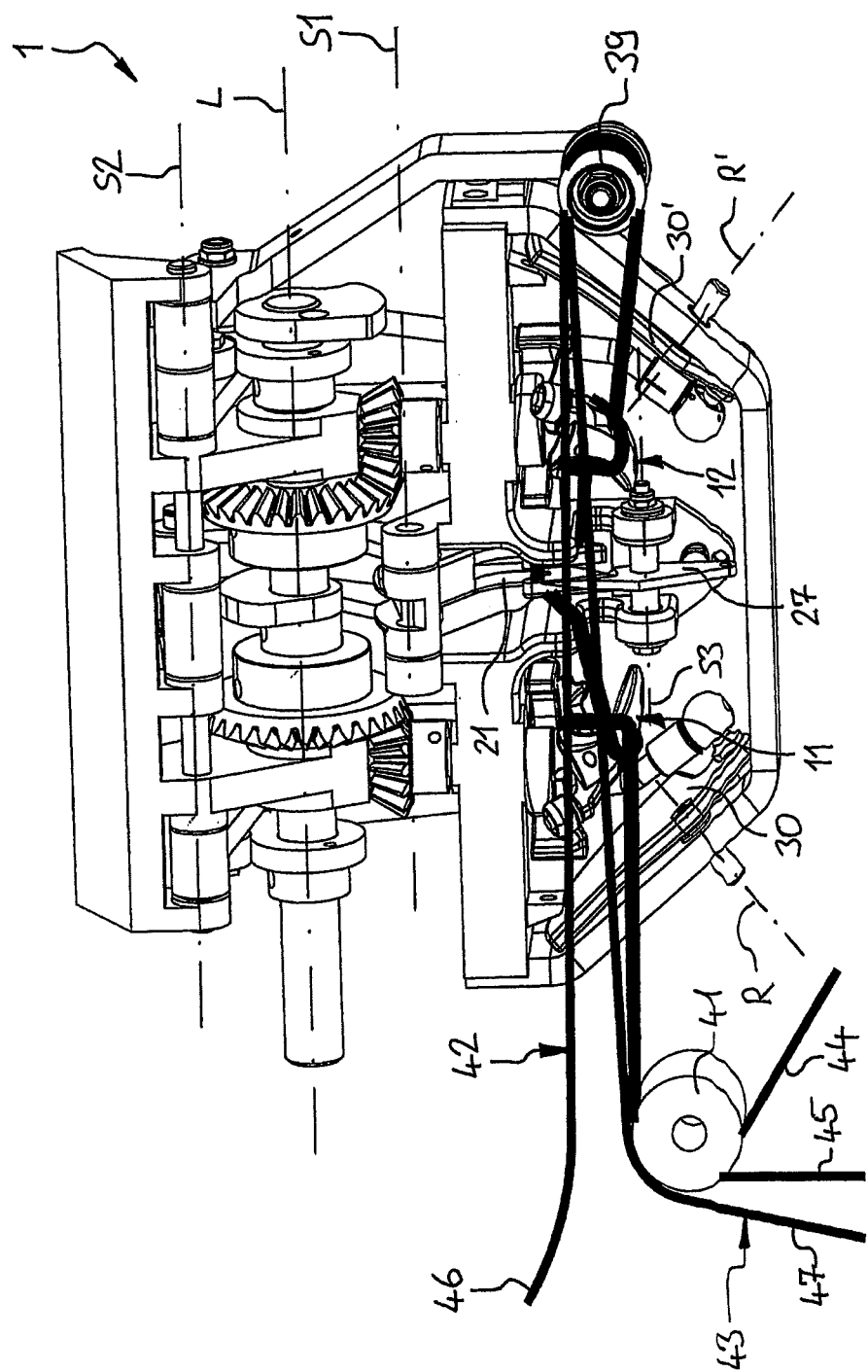
Figure 6:
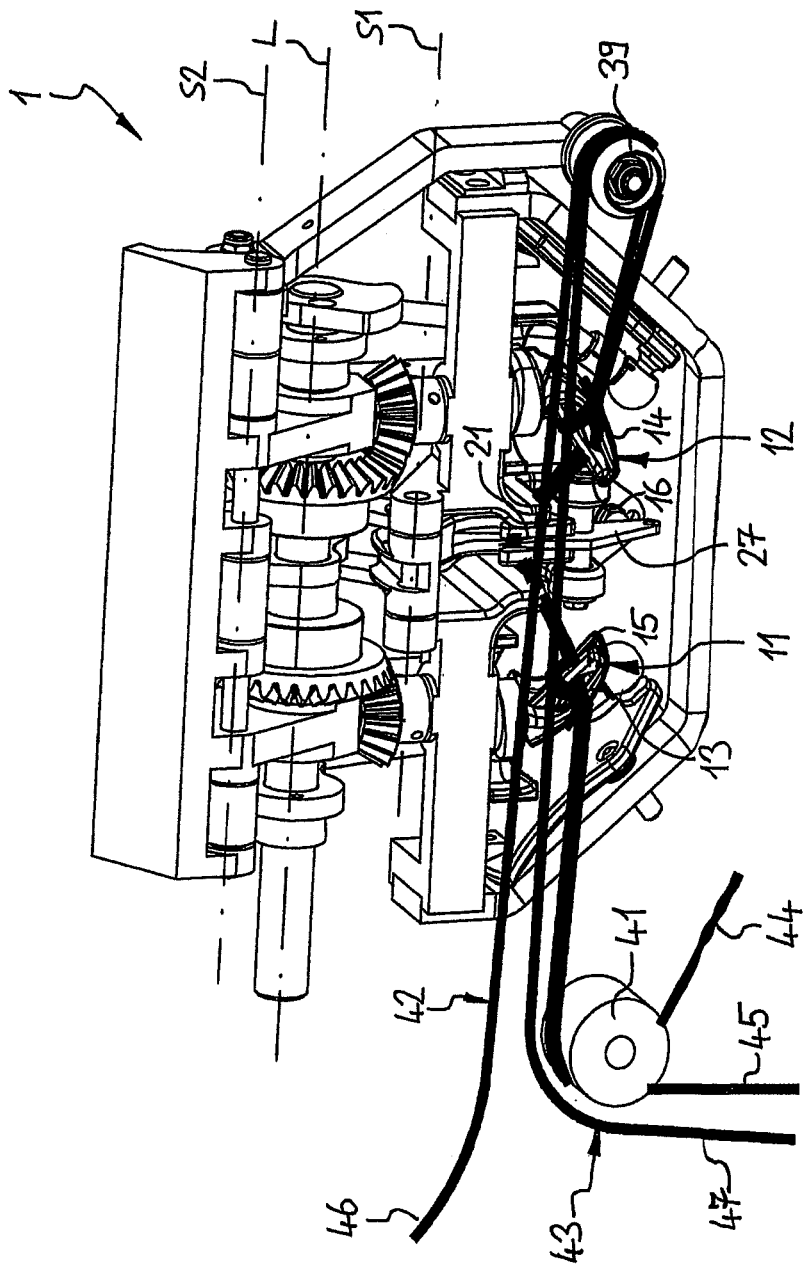

In FIG. 5, the binding needle is again pivoted out of the knotter area. Due to this, the ends 46, 47 of the twine threads 42, 43 leading to the twine roller have been arranged at the top on the redirection roller 39. The lower twine thread 43 is now also redirected around the twine redirection roller 41. The ends 44, 45 of the two twine threads 42, 43, leading to the bale, extend from the twine redirection roller 41 passed the twine catch 30, arranged again it its starting position, to the first knotter hook 11 and from there to the reserve holder 21 and further to the second knotter hook 12 and from there to the redirection roller 39.

The knotter hooks 11, 12 have the twine threads 42, 43 wound around themselves and engage with the now opened knotter tongues 15, 16 over the respective ends extending to the reserve holder 21. The reserve holder 21 moves in this course of action continuously corresponding to the rotation of the knotter hooks 11, 12 back into the front position and releases thus successively twine reserves, which the knotter hooks 11, 12 require, to wind up the twine threads 42, 43.

Figure 7:
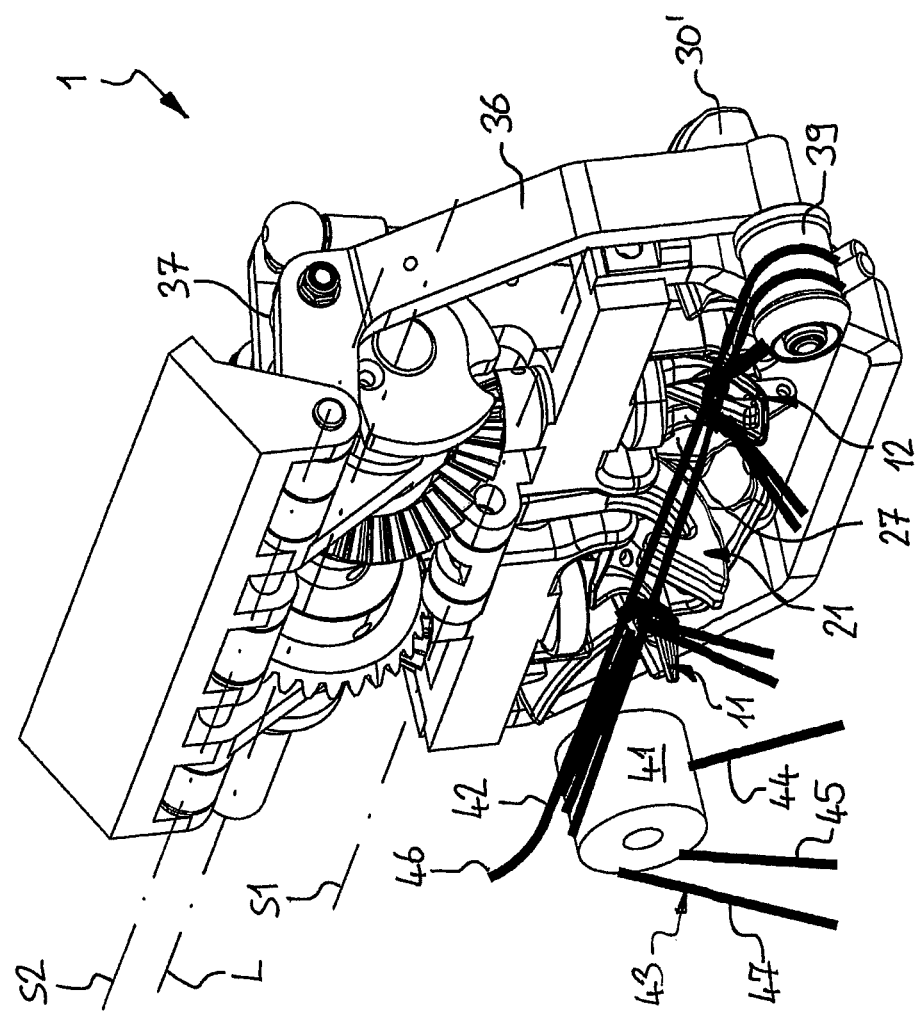

In the next step (FIG. 6) the knotter hooks 11, 12 are further rotated. The knotter tongues 15, 16 are transferred into their closed position. The twine threads 42, 43 are now respectively clamped between the knotter tongues 15, 16 and the hook portions 13, 14. The reserve holder 21 is still further pivoted forward, to release more twine reserves. The reserve holder 21 has moved the twine threads 42, 43 in front of the cutting edge 29 of the knife 27. During the further rotation of the knotter hooks 11, 12, the reserve holder 21 is further pivoted forward. In the course of this, the twine threads 42, 43 are cut by means of the knife 27 (FIG. 7).

Figure 8:
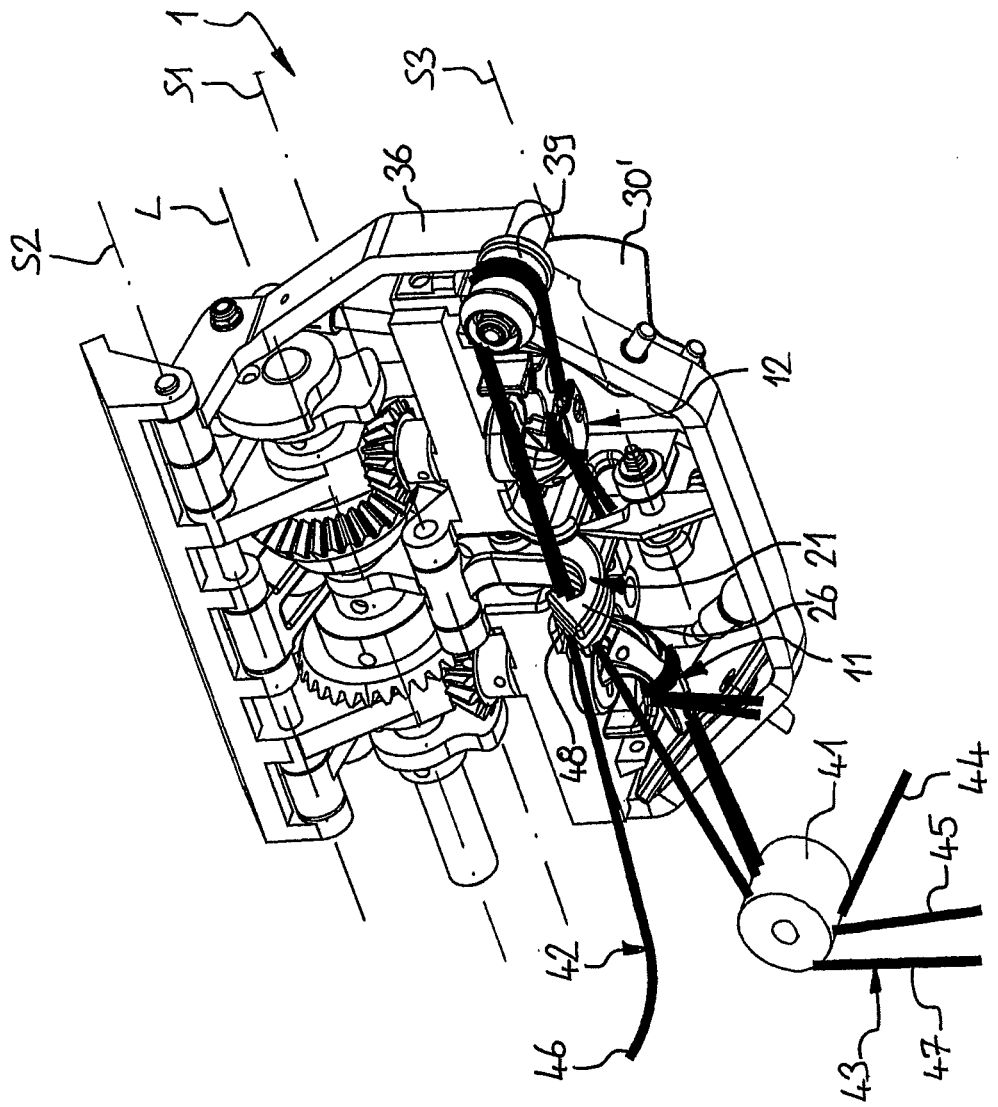

The knotter hooks 11, 12 are then further rotated till they reach again their starting position (FIG. 8). In this position, the reserve holder 21 has also again reached its front starting position. The reserve holder 21 picks up, during pivoting into the front position, the ends 46, 47 of the two twine threads 42, 43 leading to the twine roller, which in the right knotter area in FIG. 8 extend via the redirection roller 39 to the second knotter hook 12. The twine threads 42, 43 are lifted, via front chamfers 48, on the hook portion 26 of the reserve holder 21 in the forward movement of the same, till these jump into the hook portions 26.

The rotation of the knotter hooks 11, 12 is thus finished. In the further course of pressing the bales, the finished bales and the starting edge of the new bale are pushed further through the pressing channel below the twine knotter 1, thus resulting in a force on the twine threads 42, 43. By means of these forces in the twine threads 42, 43, the knot is pulled off the first knotter hook 11 and is formed. The same happens at the second knotter hook 12 wherein the twine threads 42, 43 are redirected around the redirection roller 39 so that the knot can be pulled off the second knotter hook 12 even when this extends in the opposite direction of the first knotter hook 11.

In the following, the binding process is presented by using FIGS. 9 to 16 representing schematically the whole binding device on a bale press using a binding needle with two rollers. Known elements for the twine guide, twine tensioning and twine deceleration are omitted in the representations for clarity.

Figure 9:
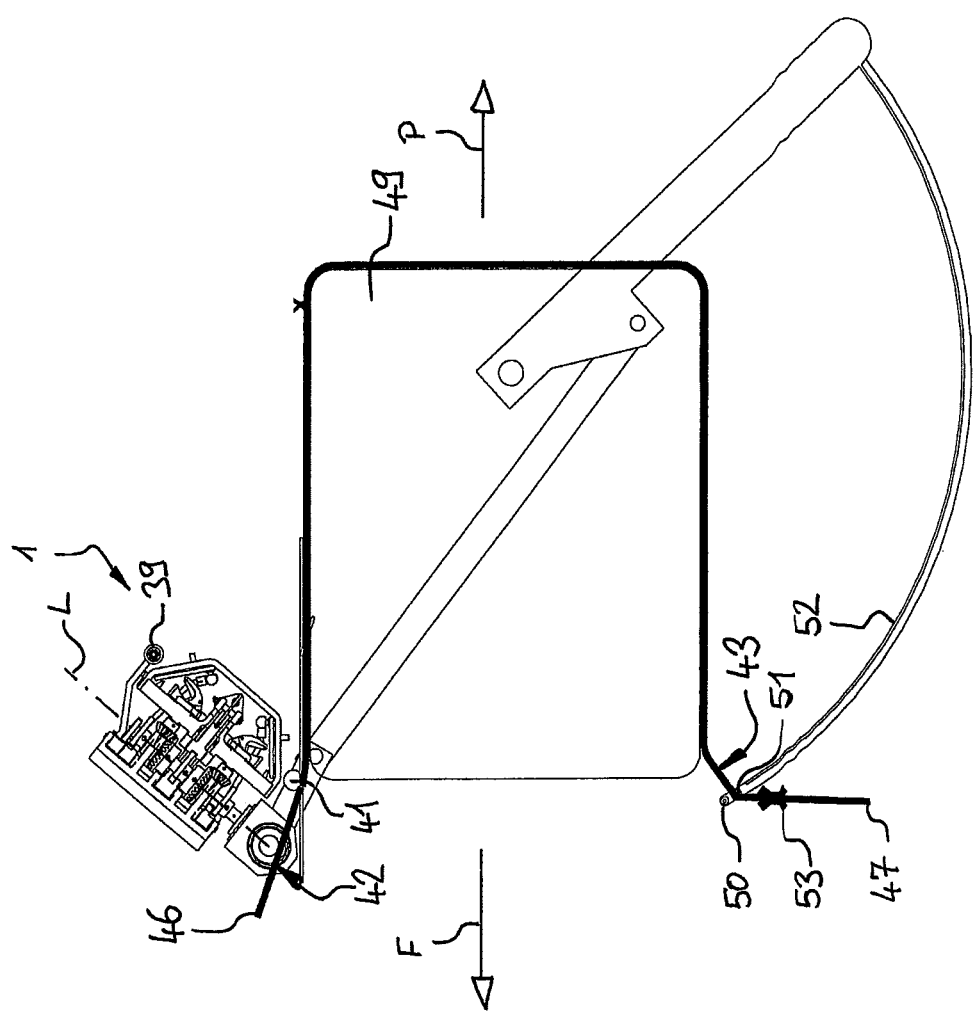
FIGS. 9-16 are side elevation views of a binding device of a twine knotter of FIG. 1 illustrating the binding process by using a binding needle with two rollers.

FIG. 9 shows the starting position of the binding device. The upper twine thread 42 extends from the (not shown) upper twine reel via the twine redirection roller 41 to the upper side of the bale 49. The bale 49 is pressed and expelled in direction of the arrow P which indicates the pressing direction. The arrow F indicates the driving direction of the bale press to which the terms "front" and "back" relate. Close to a rear edge of the bale 49, the upper twine thread 42 is knotted to a lower twine thread 43. The lower twine thread 43 extends along the rear side of the bale 49 downwards and along the bale lower side forward where it extends between two rollers 50, 51 of the binding needle 52. From there it extends further through an optionally provided shiftable twine clamp 53, via thread guides, to a lower twine reel (not shown).

Figure 10:
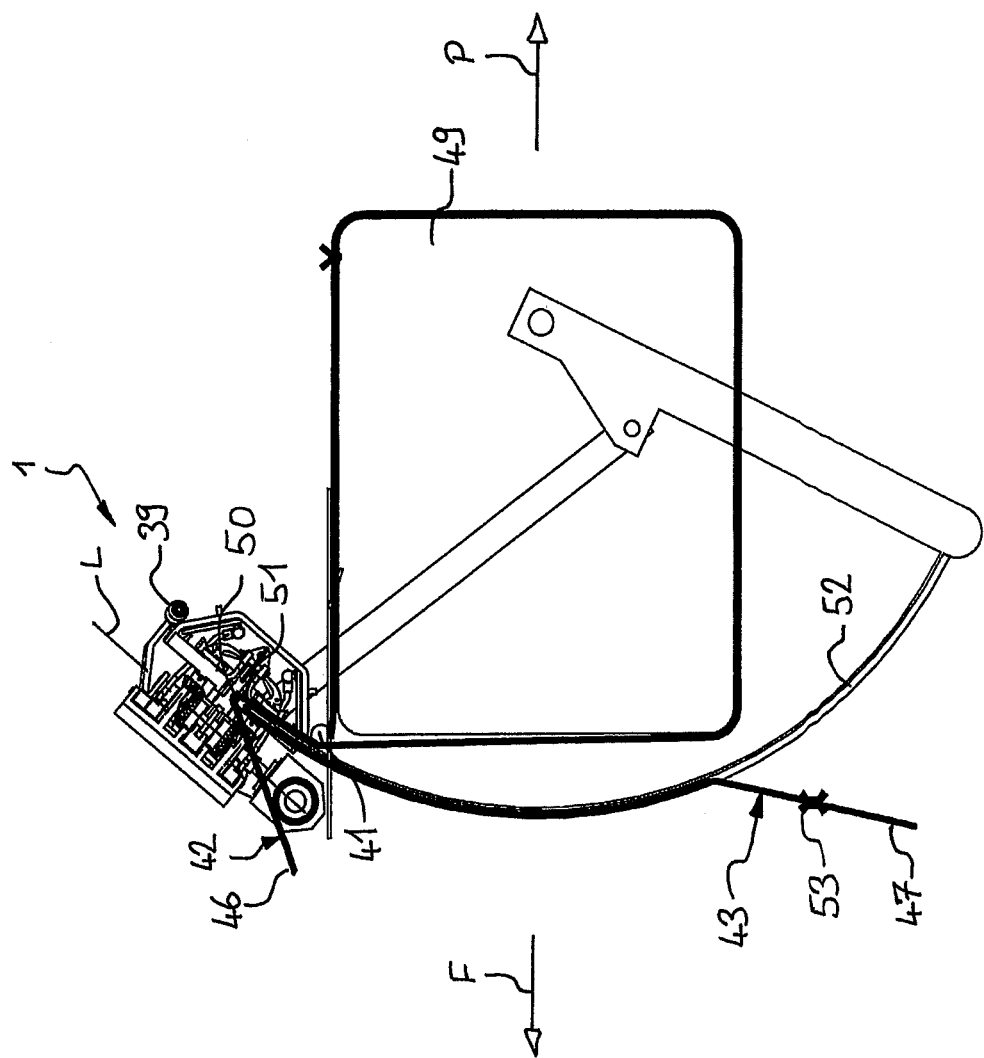

After activating the binding process, as shown in FIG. 10, the binding needle 52 is pivoted through the pressing channel, by means of which the bale 49 is pressed, and here not explicitly shown, and has transferred, in this course, the lower twine thread 43 upwards. Above the pressing channel, i.e. above the bale 49, the binding needle 52 engages with its front roller 50 the upper twine thread 42 and moves the two twine threads 42, 43 into the knotter area. The knotter elements, i.e. the twine catches 30, 30', and the reserve holder 21 are still in their starting position. Only the knotter hooks 11, 12 are rotated into a twine take up position.

Figure 11:
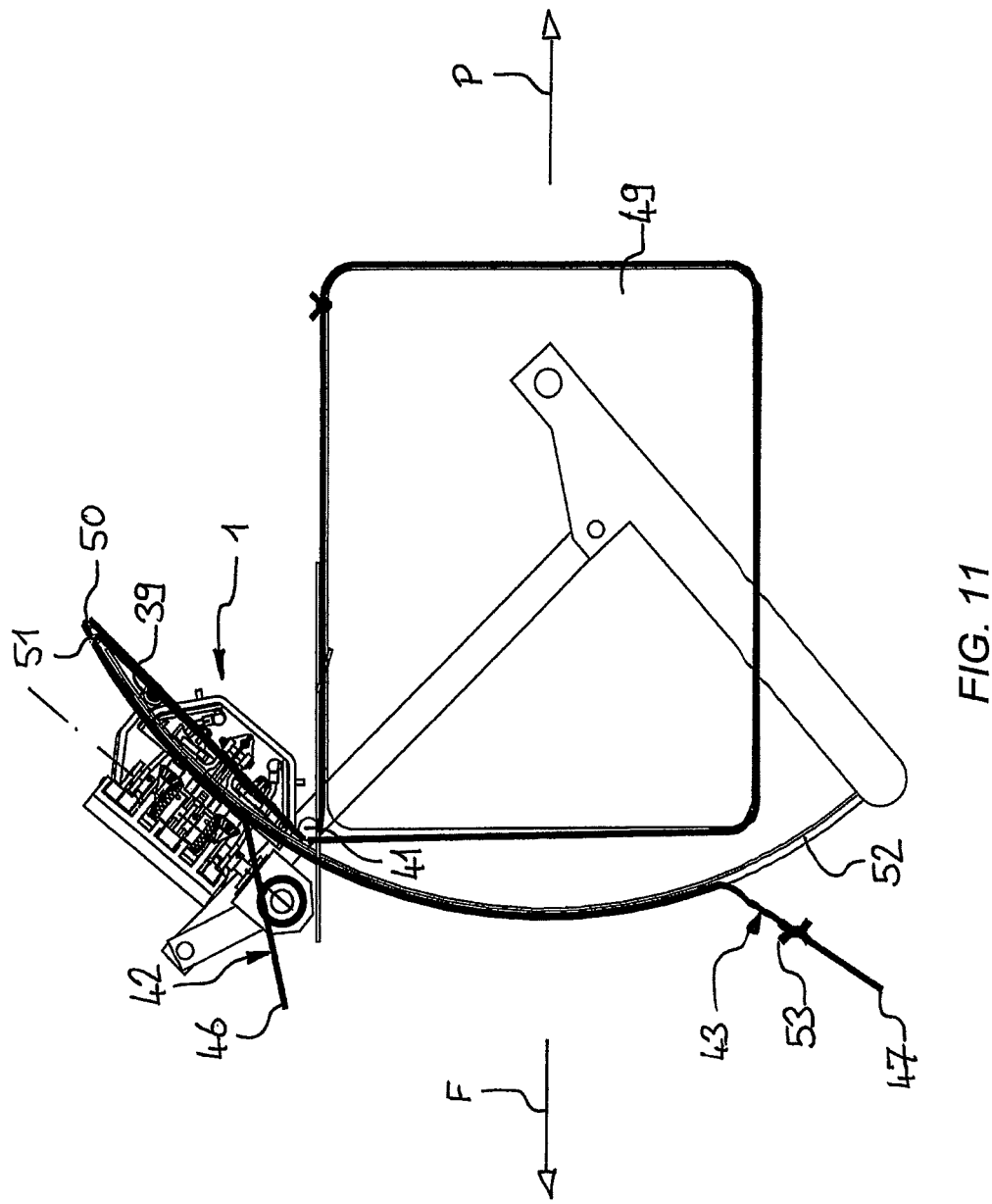

In FIG. 11, the binding needle 52 is nearly in its uppermost position. The position of the twine threads 42, 43 in the knotter area and the positioning of the knotter elements correspond to the representation of FIG. 3.

Figure 12:
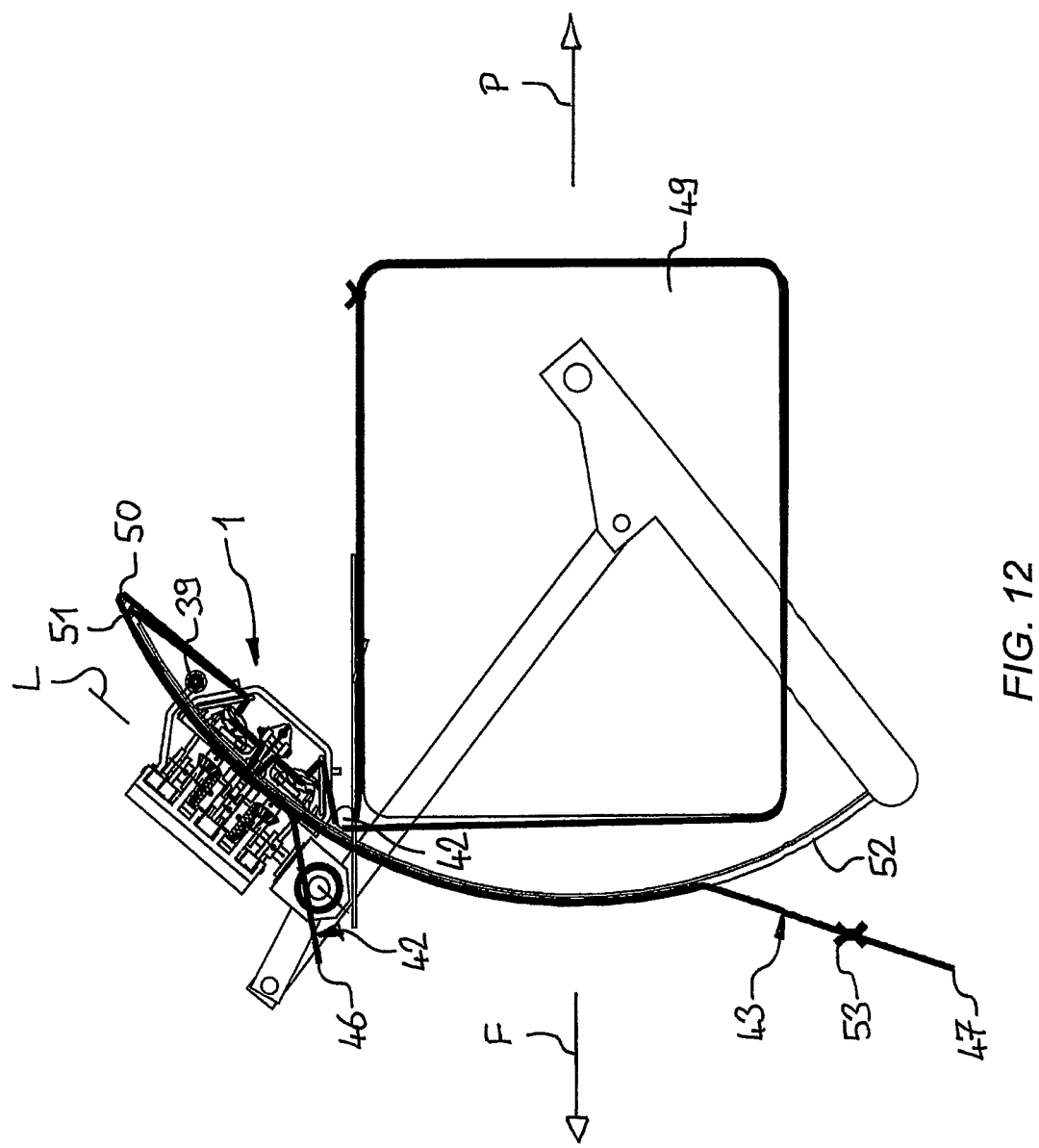

FIG. 12 shows the total representation of the binding device which corresponds to the position of FIG. 4.

Figure 13:
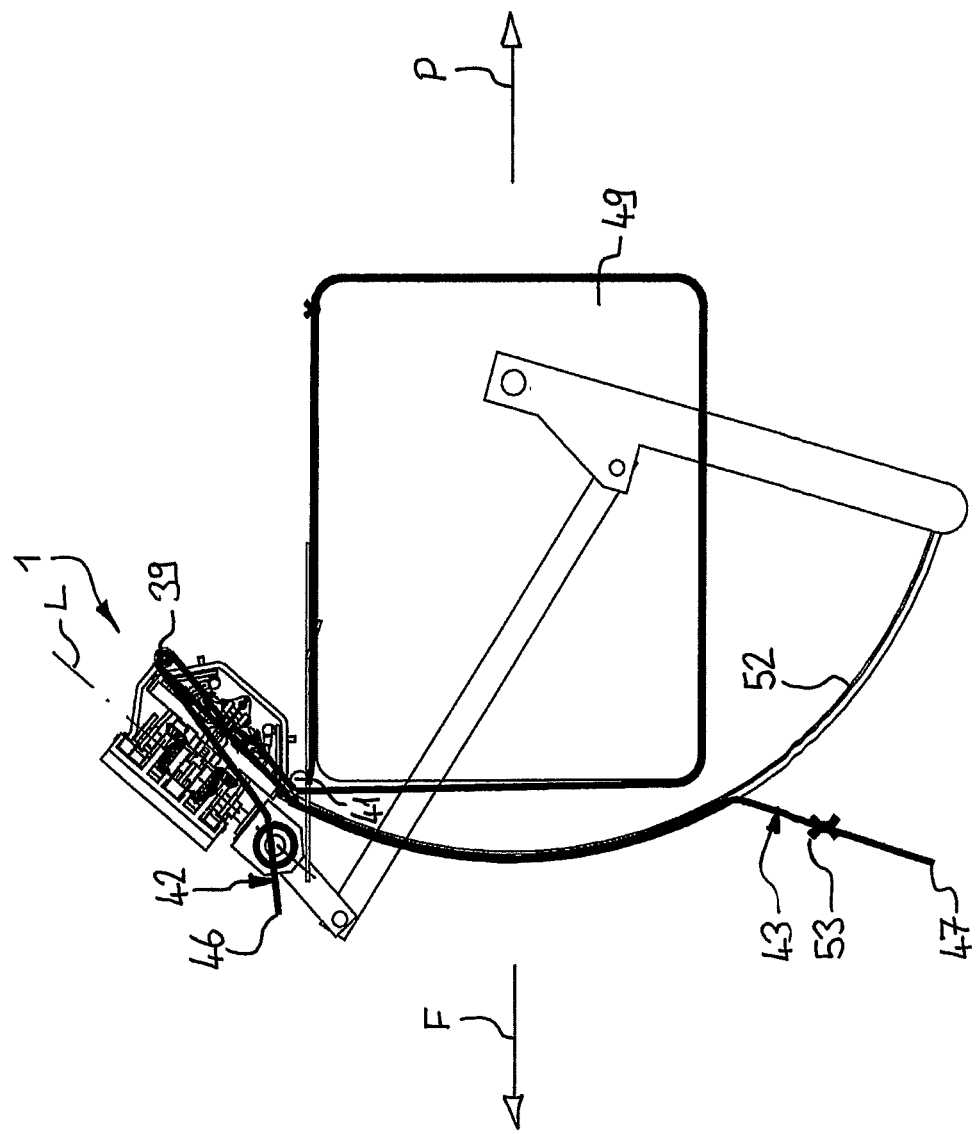

FIG. 13 corresponds in its position to FIG. 5. It is visible that the binding needle 52 has again left the knotter area at the same time has released the upper twine thread 42 and has arranged the lower twine thread 43 on the redirection roller 39.

Figure 14:
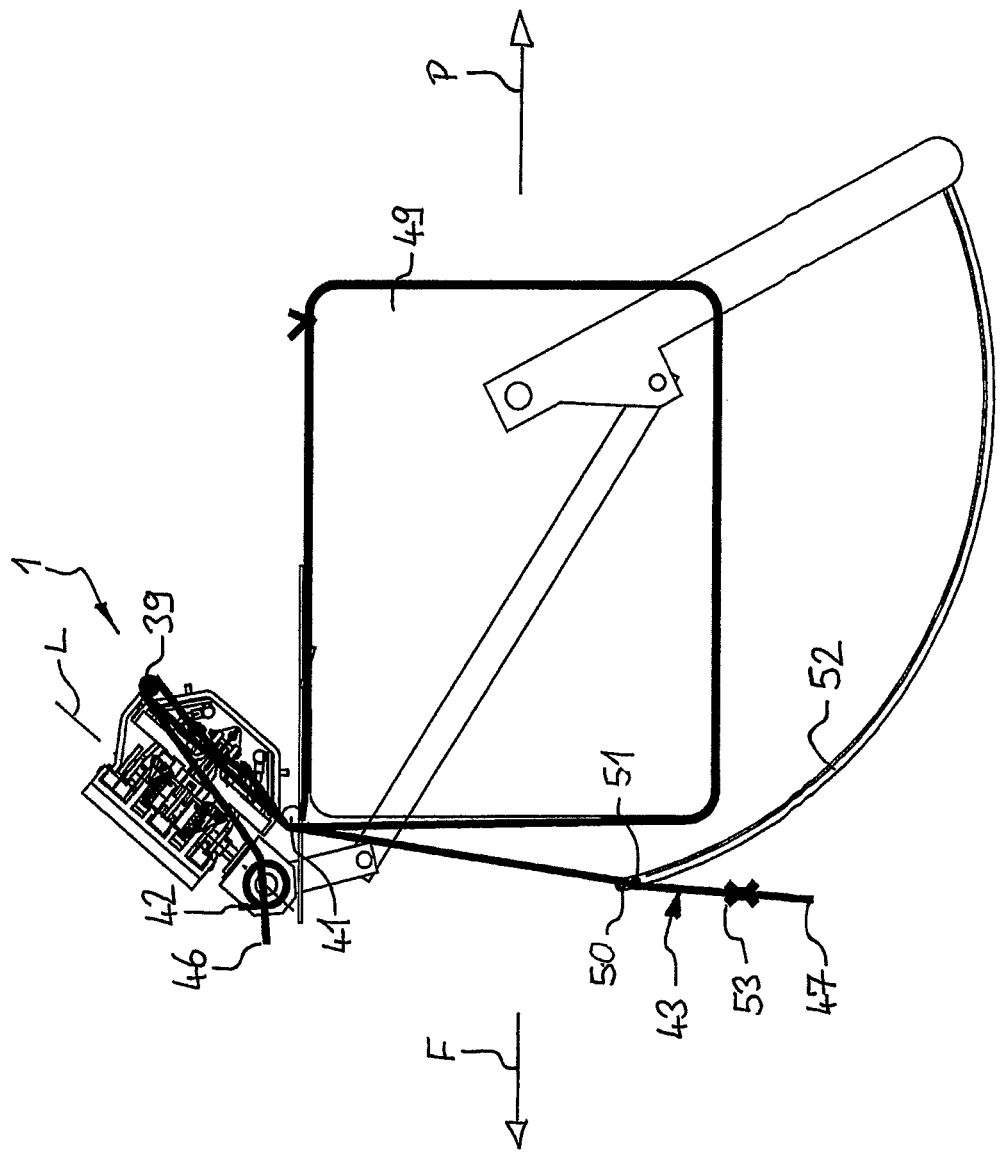

In FIG. 14 the stroke of the binding needle 52 is nearly finished. The position of the twine knotter 1 corresponds to that of FIG. 6.

Figure 15:
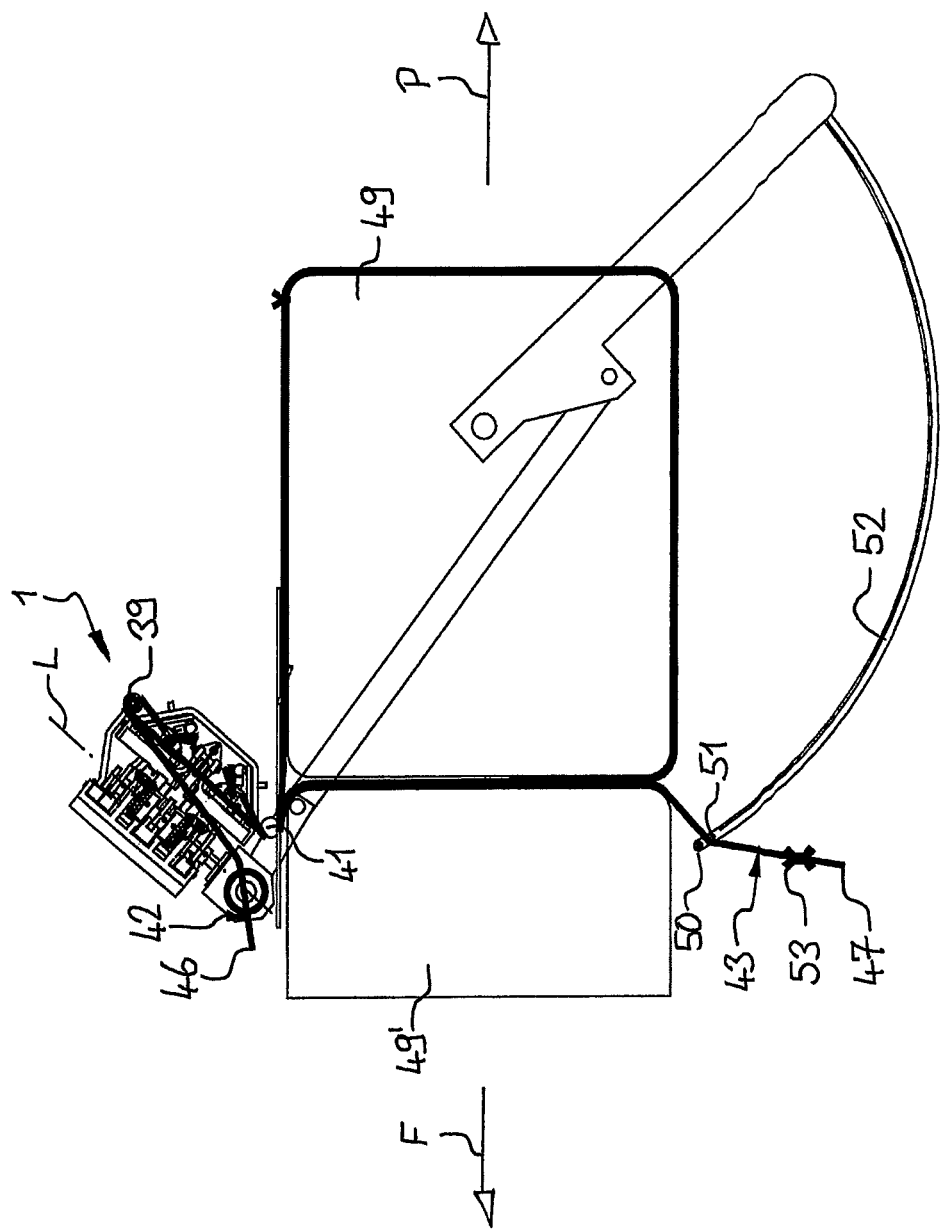

FIG. 15 shows the whole binding device after finishing the binding process. The binding needle 52 is again arranged in its starting position as well as the knotter hooks 11, 12 of the twine knotter 1. The knots are, however, still arranged on the knotter hooks 11, 12. The position corresponds to the representation of FIG. 8.

In the further progress of the pressing process, the twine threads 42, 43 are pressed between the rear finished bale 49 and the new bale 49'. During pushing, the bales 49, 49' further forwards and the twine threads 42, 43 pull the knot from the first knotter hook 11. By pressing in the lower twine thread 43 between the two bales 49, 49', the lower twine thread 43 is tensioned during the ongoing pushing of the bales 49, 49' further wherein this lower twine thread 43 pulls the knot from the second knotter hook 12, via the twine redirection roller 41 and the redirection roller 39.

In the case, that the pressing force between the bales 49, 49' is not sufficient to pull off the second knot from the second knotter hook 12, which, for example, can happen during a very loose pressing, the lower twine thread 43 can be blocked with a switchable twine clamp 53 directly after the end of the movement of the binding needle 52. Thus, the whole twine pulling, which is necessary during pushing forward of the bales 49, 49' in the pressing channel, is acting at the upper twine thread 42 and pulls the second knot off. After that, the twine clamp 53 can again be released and both twine threads 42, 43 can be pulled off during the further pressing.

Figure 16:
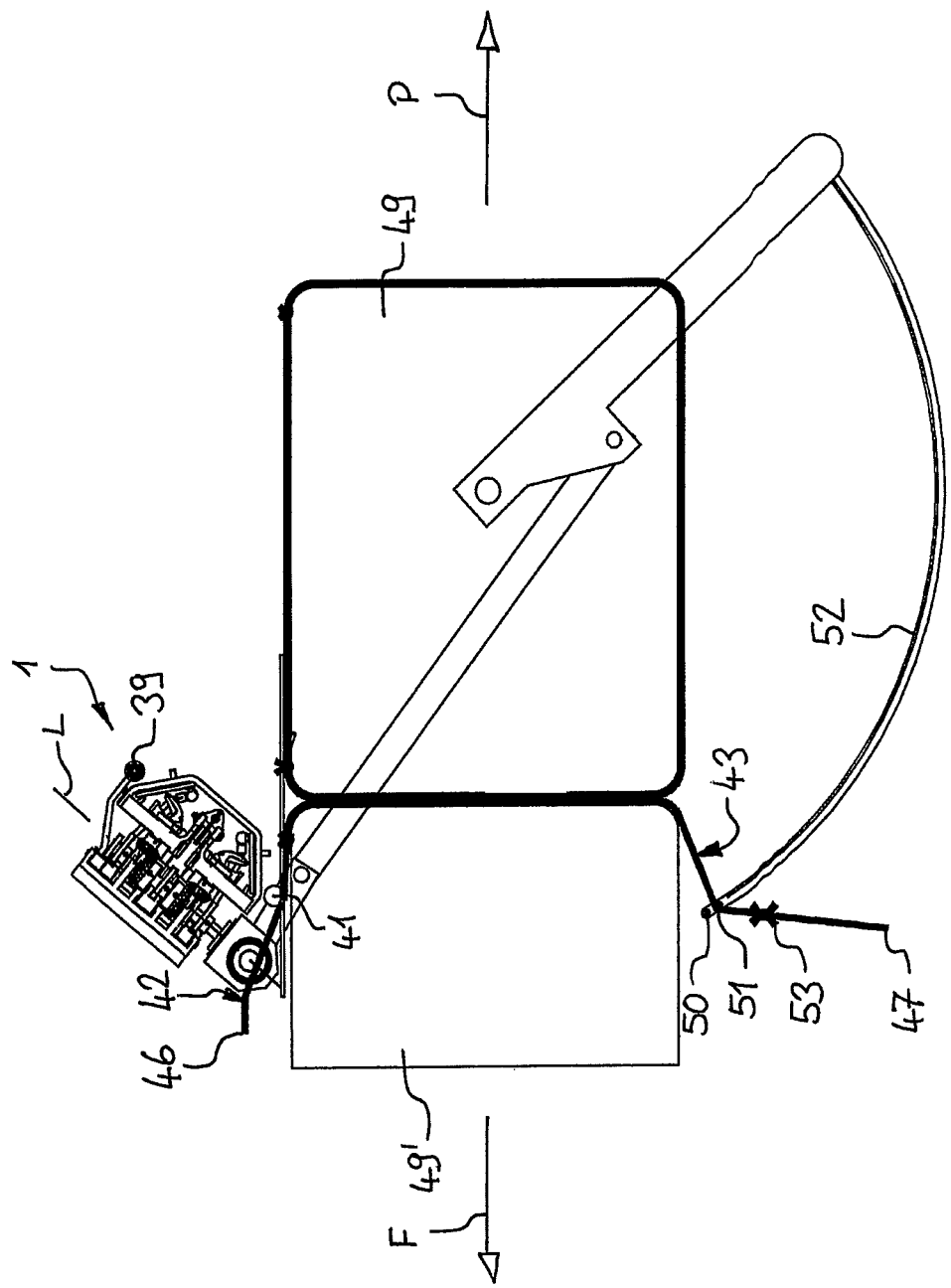

The condition after the pulling-off of the knots is shown in FIG. 16.

In FIGS. 17 to 24, an alternative binding process by means of using a so-called pointy binding needle 52' is shown analogously to the binding process of FIGS. 2 to 16.

Figure 17:
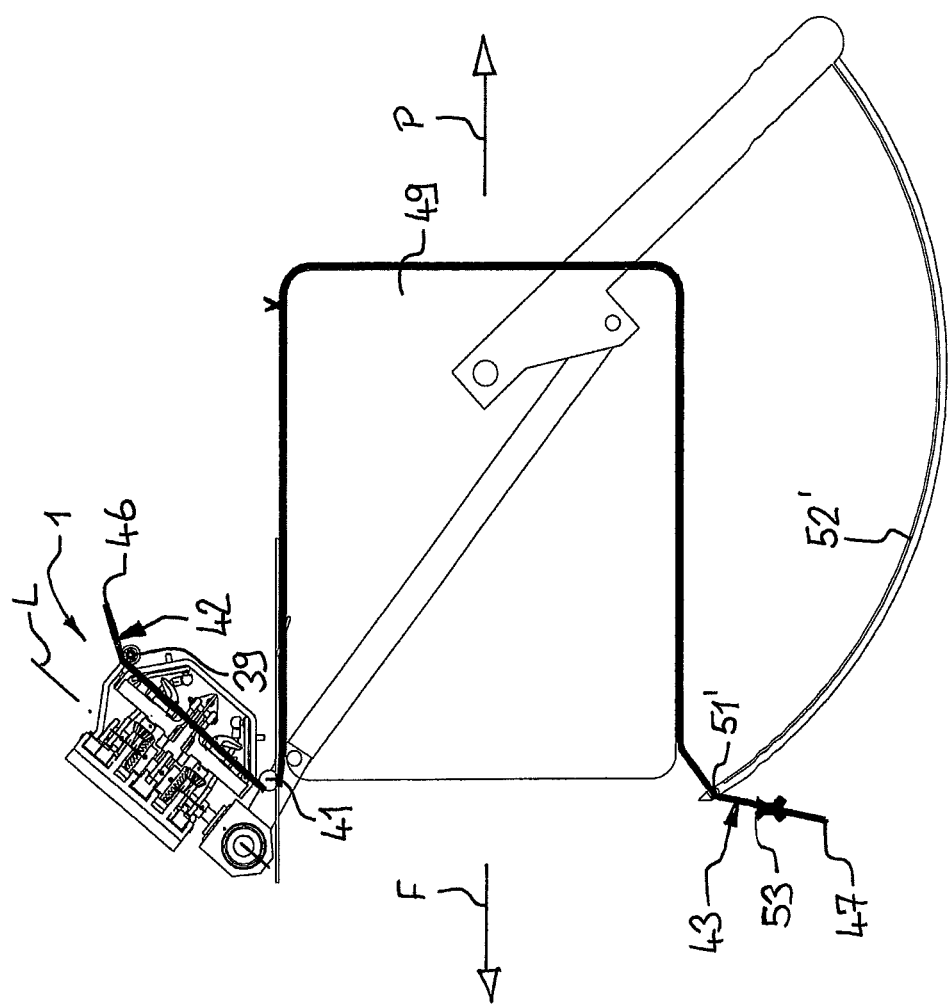
FIGS. 17-24 are side elevation views of a binding device having a twine knotter of FIG. 1 illustrating the binding process by using a pointy binding needle with one roller.

FIG. 17 shows the essential difference of a pointy binding needle 52' to a binding needle with two rollers. The pointy binding needle 52' has only one roller 51'. The upper twine thread 42 is guided, also seen in driving direction from the rear, via the redirection roller 39, passed the second knotter hook 12, via the reserve holder 21, passed the first knotter hook 11 to the twine redirection roller 41. Everything else corresponds to the binding device according to FIGS. 9 to 16.

Figure 18:
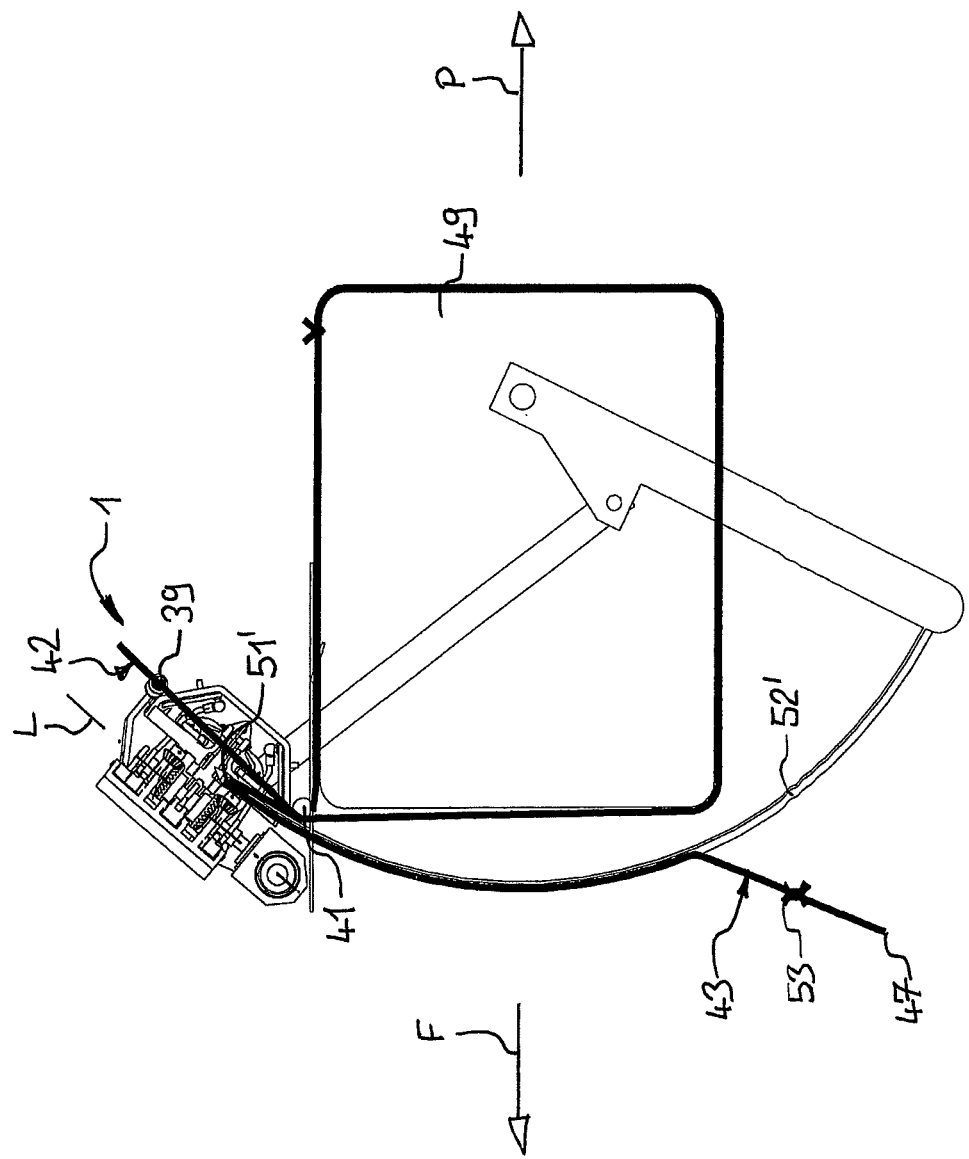

From FIG. 18, it is clear that the binding needle 52' has to transfer only the lower twine thread 43 upwards into the knotting area during its upward movement as the upper twine thread 42 is already arranged in the knotter area.

Figure 19:
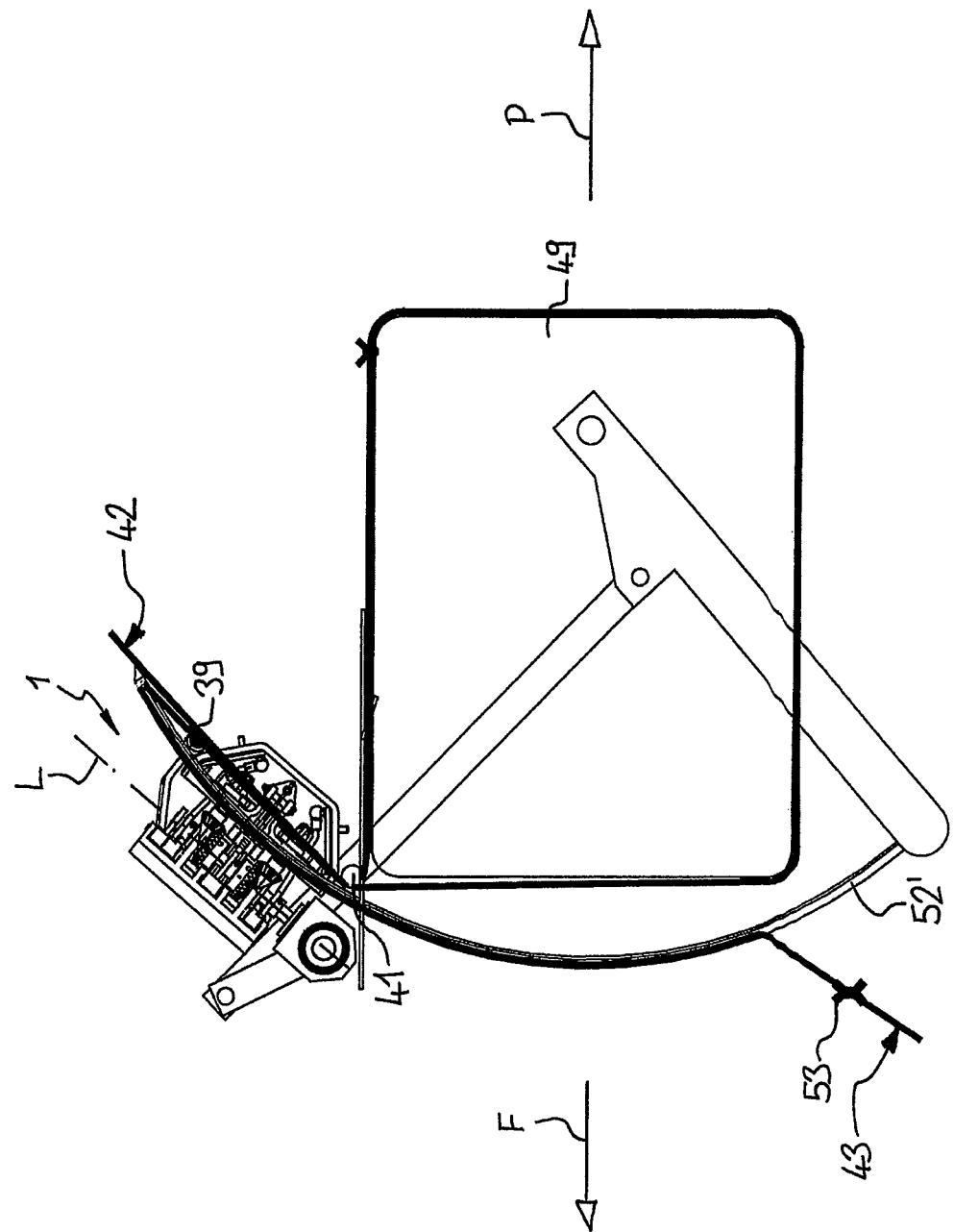

The twine guide, according to FIG. 19 corresponds to that of FIG. 11, wherein the upper twine thread 42 does not extend across the back of the binding needle 52'.

Figure 20:
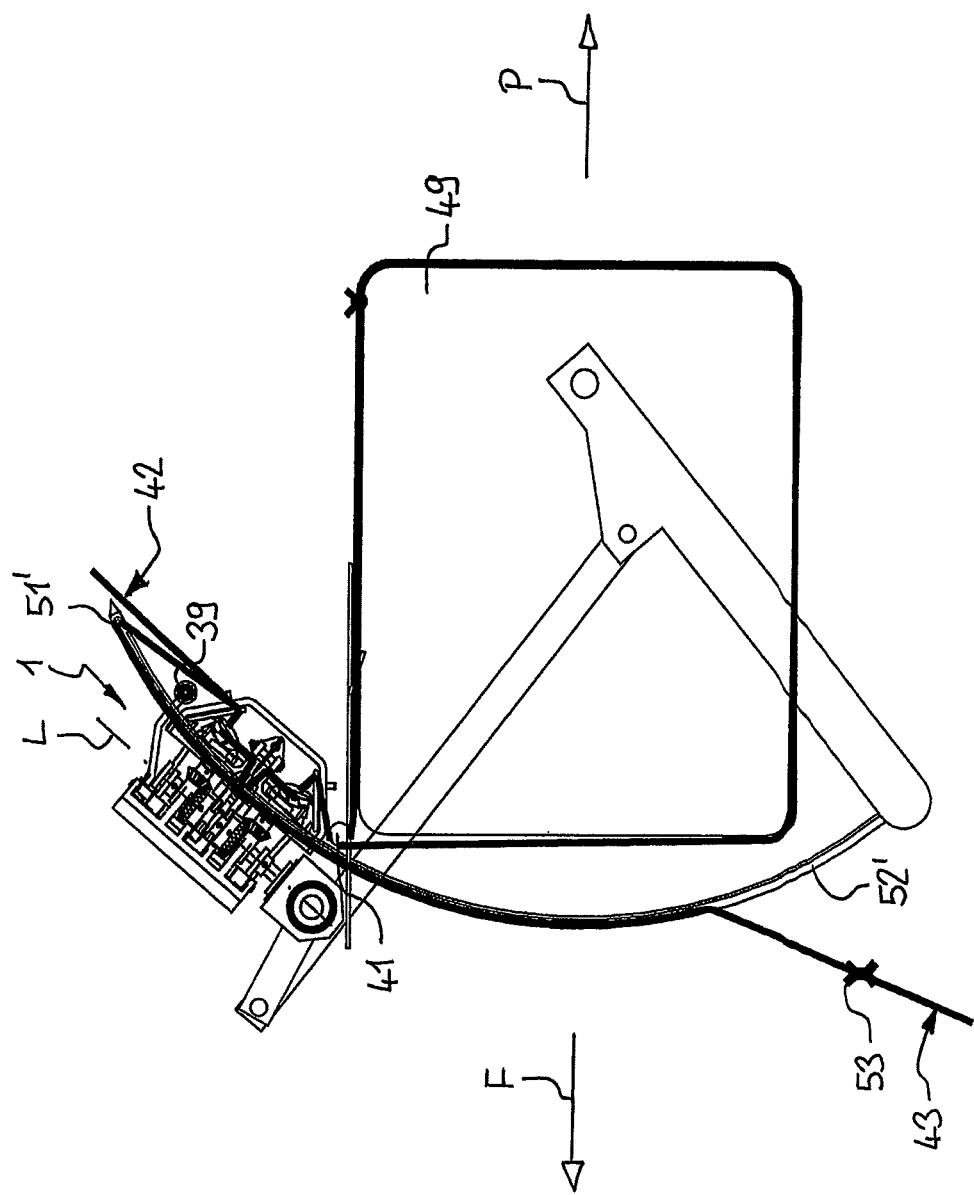
Figure 21:
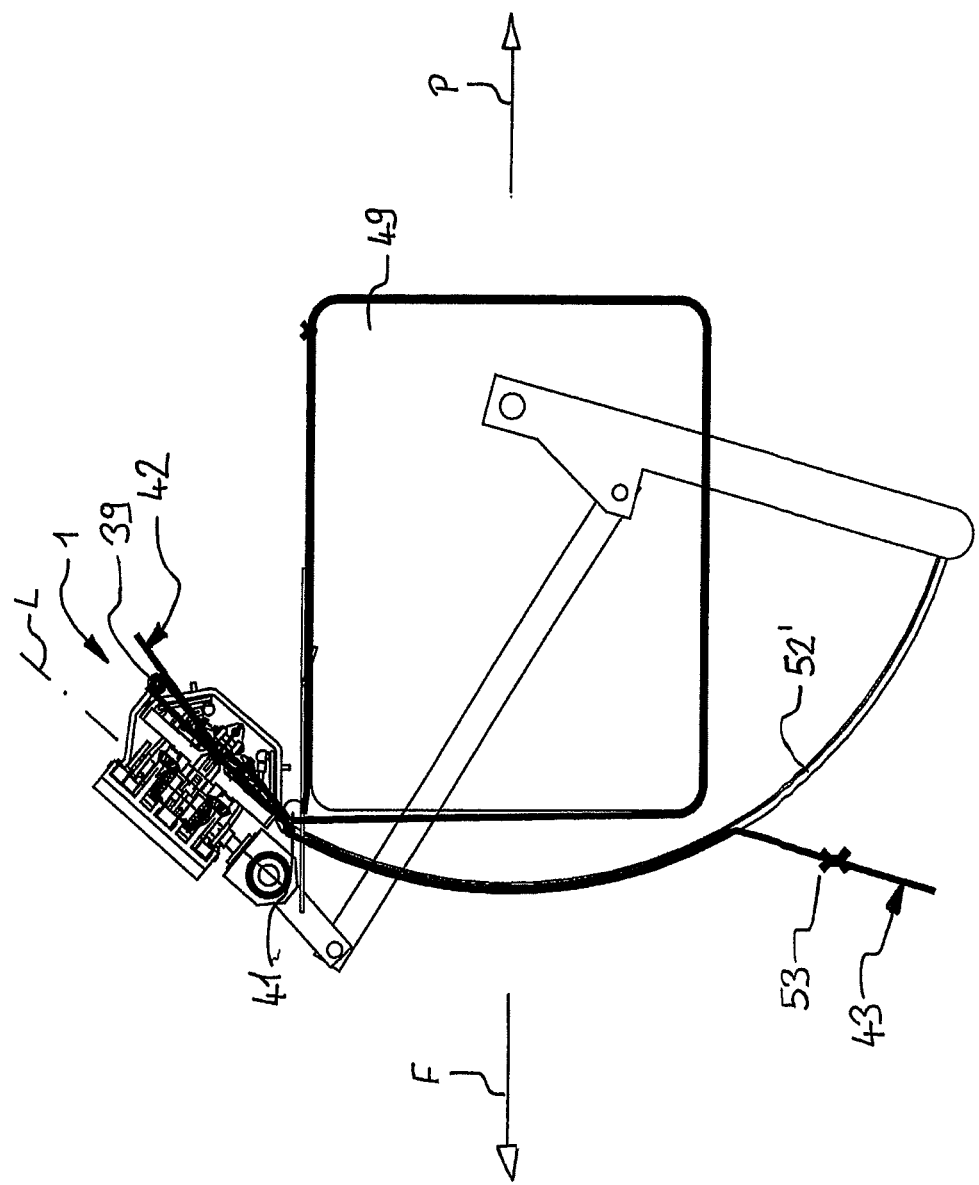
Figure 22:
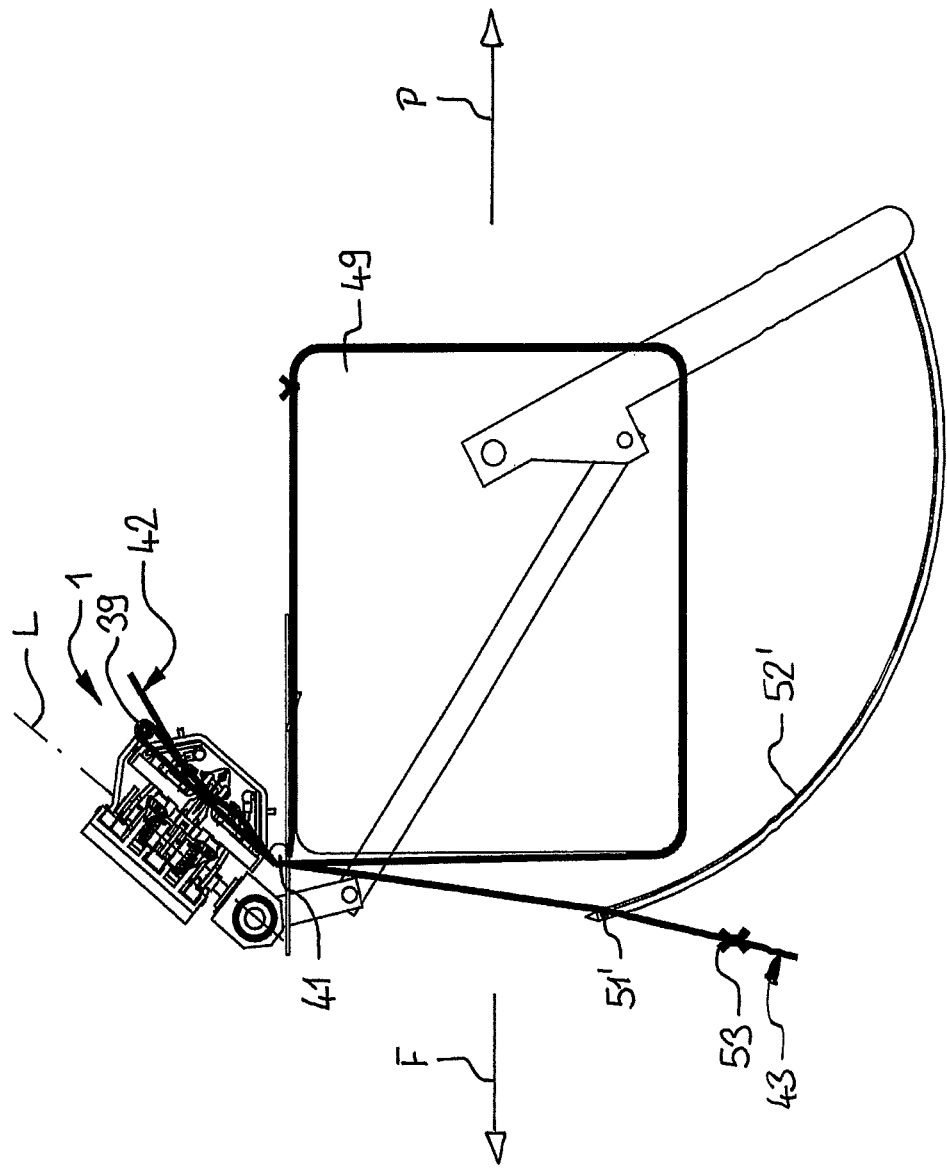

The further binding process of FIGS. 20, 21 and 22 corresponds exactly to the binding process by using a binding needle with two rollers, as this was described above in connection with FIGS. 9 to 16.

Figure 23:
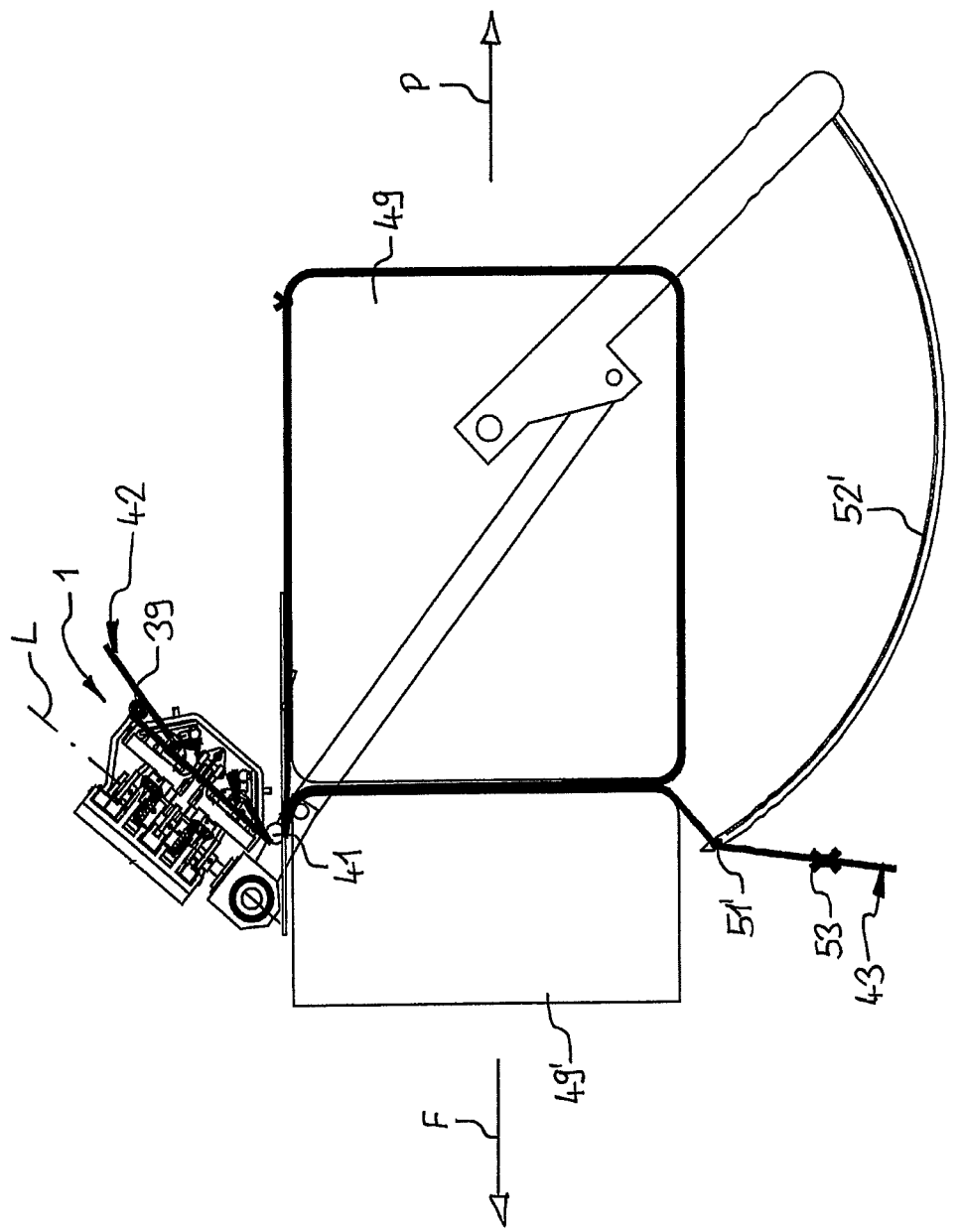

In FIG. 23, it is visible that before pulling the second knot off the second knotter hook 12 only the lower twine thread 43 extends around the deflecting roller 39. The upper twine thread 42 extends directly via the corresponding thread guide to the upper twine reel.

Figure 24:
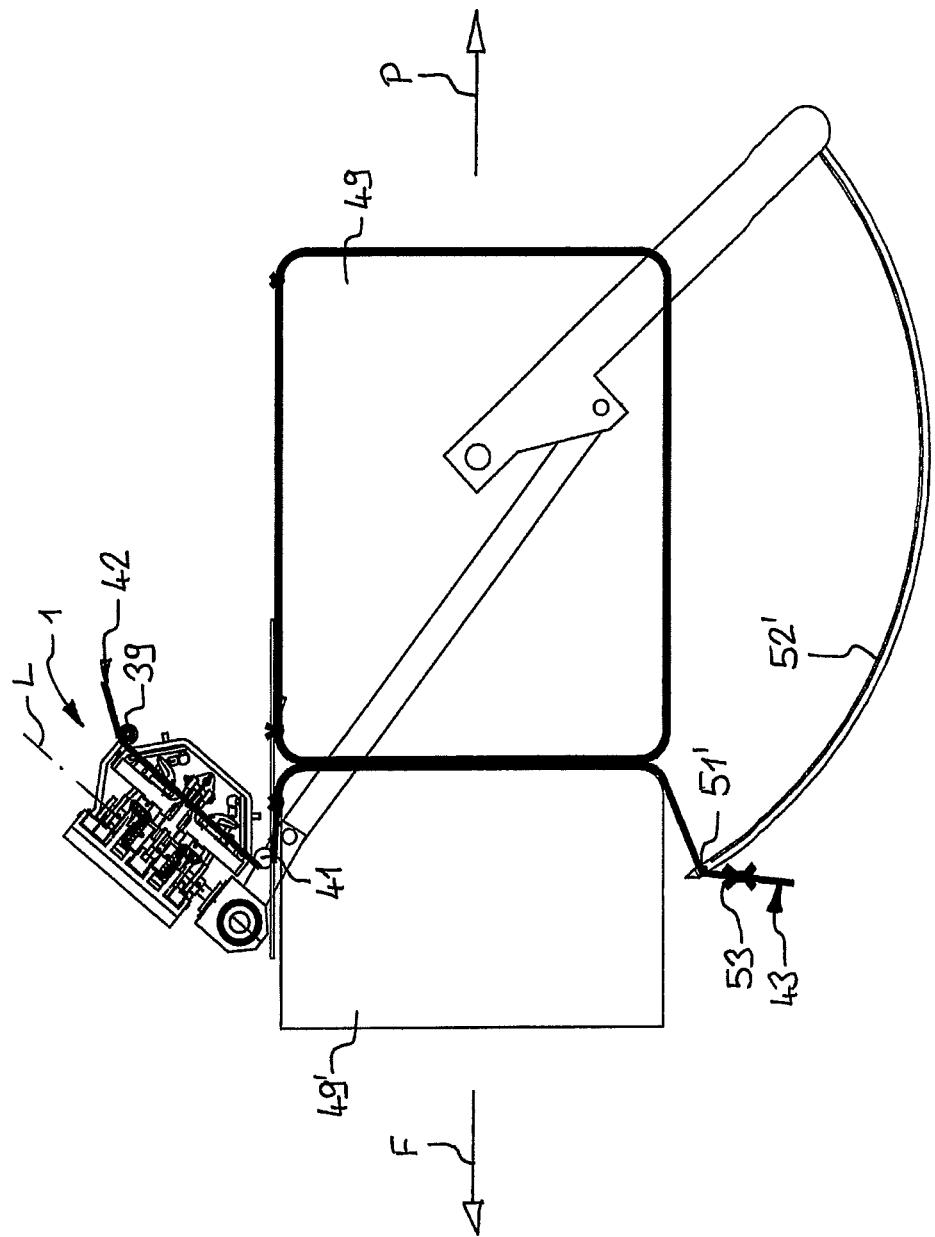

After pulling the knots off the knotter hooks 12, 13, the second knot is pulled from the second knotter hook 12 by the lower twine thread 43, via the redirection roller 39, the reserve holder 21 and the twine redirection roller 41 and put onto the bale, as shown in FIG. 24.

In both versions of the binding needle, i.e. a binding needle with two rollers or a pointy binding needle, the second knot is only pulled off by the lower twine thread 43 from the second knotter hook 12. During the described binding process, the knotter extraction only takes place because of the bale movement in the pressing channel and the upper twine thread 42 does not receive a tensioning force from this side after the binding process. Thus, it seems necessary, to provide at least a sufficient tensioning force by the lower twine thread 43, which is provided independently of the pressing density. A relative simple measure is the switchable twine clamp 53 described above. Alternatively also active devices are thinkable, which act with direct tension onto the upper twine thread 42.

Figure 25:
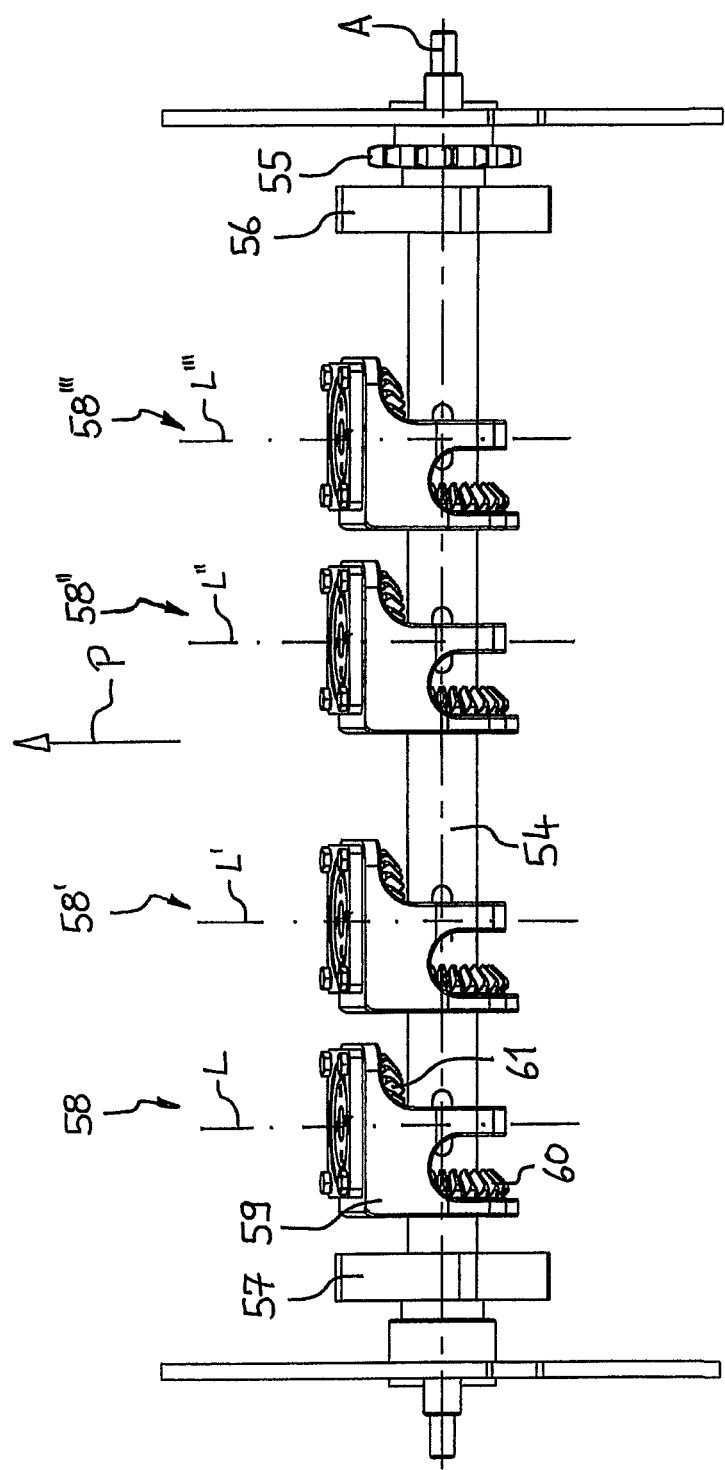
FIG. 25 is a perspective view of a knotter drive shaft.

FIG. 25 shows a knotter drive shaft 54. The knotter drive shaft 54 is rotatably drivable via a pinion gear 55 around the drive axis A. The knotter drive shaft 54 extends generally transversally across the pressing channel of a big bale press. The knotter drive shaft 54 is rotatably mounted via two bearings 56, 57 on the pressing channel. The knotter drive shaft 54 carries four angle drives 58, 58', 58'', 58'''. The angle drive 58, shown in FIG. 25 on the left, is described in more detail. All angle drives 58, 58', 58'', 58''' are constructed identically. The angle drive 58 includes a housing 59. The housing 59 is mounted on the pressing channel or on a frame of the big bale press. Thus, the housing 59 is non-rotationally held relative to the knotter drive shaft 54. The angle drive 58 includes a first bevel-gear 60. The bevel gear 60 is non-rotationally connected to the knotter drive shaft 54 and meshes with an output element in the form of a second bevel-gear 61. The second bevel-gear 61 is rotatably supported in the housing 59. The second bevel-gear 61 serves as output element that is non-rotationally connected to the intermediate shaft of the twine knotter. The second bevel-gear 61 is thus rotatably supported around the longitudinal axis L of the intermediate shaft of the twine knotter.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and, all such modifications are intended to be included within the scope of the disclosure.

What is claimed is:
1. A twine knotter comprising:
a knotter frame;
an intermediate shaft rotatably supported on the knotter frame around a longitudinal axis, a shaft input connects the intermediate shaft to an output element of a knotter drive shaft;

at least one knotter hook shaft is rotatably supported around a knotter hook axis on the knotter frame, the at least one knotter hook shaft is drive-wise connected to the intermediate shaft, the at least one knotter hook shaft carries a knotter hook to form a knot;

a bracket coupled with the knotter frame, the bracket including a mechanism enabling the knotter frame to be attached and detached to a press for enabling the twine knotter to be readily removed from a press; and the twine knotter is formed as an independent unit so that the twine knotter is drive-wise detachably connectable, via the shaft input of the intermediate shaft, to the knotter drive shaft.

2. The twine knotter according to claim 1, wherein the knotter hook axis intersects the longitudinal axis or crosses the same at a distance.

3. The twine knotter according to claim 1, wherein two knotter hook shafts are provided, each is rotatably supported around a knotter hook axis on the knotter frame and is drive-wise connected to the intermediate shaft.

4. The twine knotter according to claim 3, wherein the knotter hook axes of the two knotter hook shafts are arranged parallel to each other.

5. The twine knotter according to claim 1, wherein the at least one knotter hook shaft is drive-wise connected, via a bevel-gear connection, to the intermediate shaft.

6. The twine knotter according to claim 5, wherein the gear connection has a gear that non-rotatably sits on the intermediate shaft and has teeth uninterrupted about the gear circumference.

7. The twine knotter according to claim 1, wherein a reserve holder is provided for temporarily forming a twine reserve, the reserve holder is driven by the intermediate shaft and is movably held on the knotter frame.

8. The twine knotter according to claim 1, wherein at least one twine catch is provided to press twine threads against the knotter hook of the at least one knotter hook shaft, the twine catch is driven by the intermediate shaft and is movably held on the knotter frame.

9. The twine knotter according to claim 1, wherein a redirection device is provided to redirecting the twine threads, the redirection device is movably held on the knotter frame and is driven by the intermediate shaft.

10. The twine knotter according to claim 7, wherein at least one device selected from the group of a reserve holder, twine catch and redirection device is driven and controlled via a control cam on the intermediate shaft.

11. The twine knotter according to claim 9, wherein at least one device selected from the group of reserve holder, twine catch and redirection device has a lever, pivotable around a pivot axis arranged parallel to the longitudinal axis on the knotter frame and which is loaded by a force via a control element against the respective control cam of the intermediate shaft.

12. The twine knotter according to claim 11, wherein a coupling rod is arranged between the lever and the respective selected device from the group of reserve holder, twine catch and redirection device.

13. A drive arrangement having a knotter drive shaft and several twine knotters according to claim 1, wherein an angle gear with an output element is provided on the knotter drive shaft for each twine knotter.

14. The drive arrangement according to claim 13, wherein a gear ratio of the drive arrangement is rated such that the knotter hook shafts of the twine knotters carry out two revolutions during one revolution of the knotter drive shaft.

15. A method for forming two knots comprising the steps of:
    providing twine knotter according to claim 1 which has two knotter shafts;
    positioning an upper twine thread and a lower twine thread in an operating area of a first knotter hook and of a second knotter hook of the twine knotter and both knotter hooks are in a starting position;
    rotating the knotter hooks from the starting position into an abutment position, the upper twine thread and the lower twine thread come to rest on the knotter hooks;
    subsequently rotating the knotter hooks for one revolution to form, respectively, one loop from both twine threads;
    subsequently cutting the twine threads between the knotter hooks; and
    rotating the knotter hooks further up to the starting position.

16. The method according to claim 15, wherein the knotter hooks are rotated for each knotting process around two full revolutions.

17. The method according to claim 15, wherein at least one of the twine threads is brought by a binding needle along a twine feeding direction into an operating area of the knotter hooks; and
    in the starting position of the knotter hooks, the formed loops are pulled off against the twine feeding direction from the first knotter hook and in twine feeding direction from the second knotter hook by advancing material to be pressed in a pressing channel.

18. The method according to claim 15, wherein during rotating of the knotter hooks to form the loops, one twine catch is actuated for each knotter hook that holds the upper twine thread and the lower twine thread on a hook portion of the knotter hook; and
    when actuating the twine catch, a redirection roller of a redirection device is actuated so that the upper twine thread and the lower twine thread are guided from the second knotter hook in twine feeding direction to the redirection roller and therefrom against the twine feeding direction up to the pressing channel.

19. The method according to claim 15, wherein the loop knots are formed with twine ends not pulled through and without waste pieces.

* * * * *